United States Patent [19]
Matsui et al.

[11] Patent Number: 5,473,139
[45] Date of Patent: Dec. 5, 1995

[54] PULSED ARC WELDING APPARATUS HAVING A CONSUMABLE ELECTRODE WIRE

[75] Inventors: Hitoshi Matsui; Satoshi Shionoya, both of Toyota, Japan

[73] Assignee: Toyota Jidosha Kabushiki Kaisha, Toyota, Japan

[21] Appl. No.: 174,483

[22] Filed: Dec. 28, 1993

[30] Foreign Application Priority Data

| Jan. 18, 1993 | [JP] | Japan | 5-006219 |
| Jan. 20, 1993 | [JP] | Japan | 5-007942 |
| Apr. 6, 1993 | [JP] | Japan | 5-079752 |

[51] Int. Cl.$^6$ .................................. B23K 9/09
[52] U.S. Cl. ........................ 219/130.51; 219/74
[58] Field of Search ............... 219/137 PS, 130.51, 219/74, 137 R

[56] References Cited

U.S. PATENT DOCUMENTS

| 3,781,511 | 12/1973 | Rygiol | 219/137 R |
| 3,864,542 | 2/1975 | Fletcher et al. | 219/137 R |
| 5,192,851 | 3/1993 | James et al. | 219/130.51 |

FOREIGN PATENT DOCUMENTS

| 57-209778 | 12/1982 | Japan . |
| 58-084676 | 5/1983 | Japan . |
| 58-141849 | 8/1983 | Japan . |
| 2-37975 | 2/1990 | Japan . |
| 3-193269 | 8/1991 | Japan . |
| 2144595 | 3/1985 | United Kingdom . |

OTHER PUBLICATIONS

"Development of Low frequent Pulsed Arc MIG Welding Method" by H. Yamamoto et al. (vol. 7, pp. 116–117, Oct. 1990, Japan) from the Institute of Welding Engineers of Japan.

"Recent Arc Welding Machines" by T. Mita (pp. 165–171, Aug. 1991, Japan) from the Welding Technology Magazine of Japan.

*Primary Examiner*—Clifford C. Shaw
*Attorney, Agent, or Firm*—Kenyon & Kenyon

[57] ABSTRACT

A pulsed arc welding apparatus includes a consumable electrode wire which is fed toward a workpiece at a wire feeding rate, a power supply for supplying a welding current to the wire to produce a droplet at the end of the wire by the heat of arc, a pulse form setting part for setting a pulse form of the welding current supplied by the power supply, based on a peak current and a pulse duration, an optimum pulse determining part for determining a peak current and a pulse duration for each of pulses of the welding current based on an average current and for supplying the peak current and the pulse duration to the pulse form setting part so that each respective peak current and each respective pulse duration of the welding current supplied to the wire have a minimum value needed to transfer a droplet from the wire to the workpiece for each pulse at a rate synchronous with the wire feeding rate, and an average current setting part for setting the average current based on the wire feeding rate and for supplying the average current to the optimum pulse determining part.

3 Claims, 17 Drawing Sheets

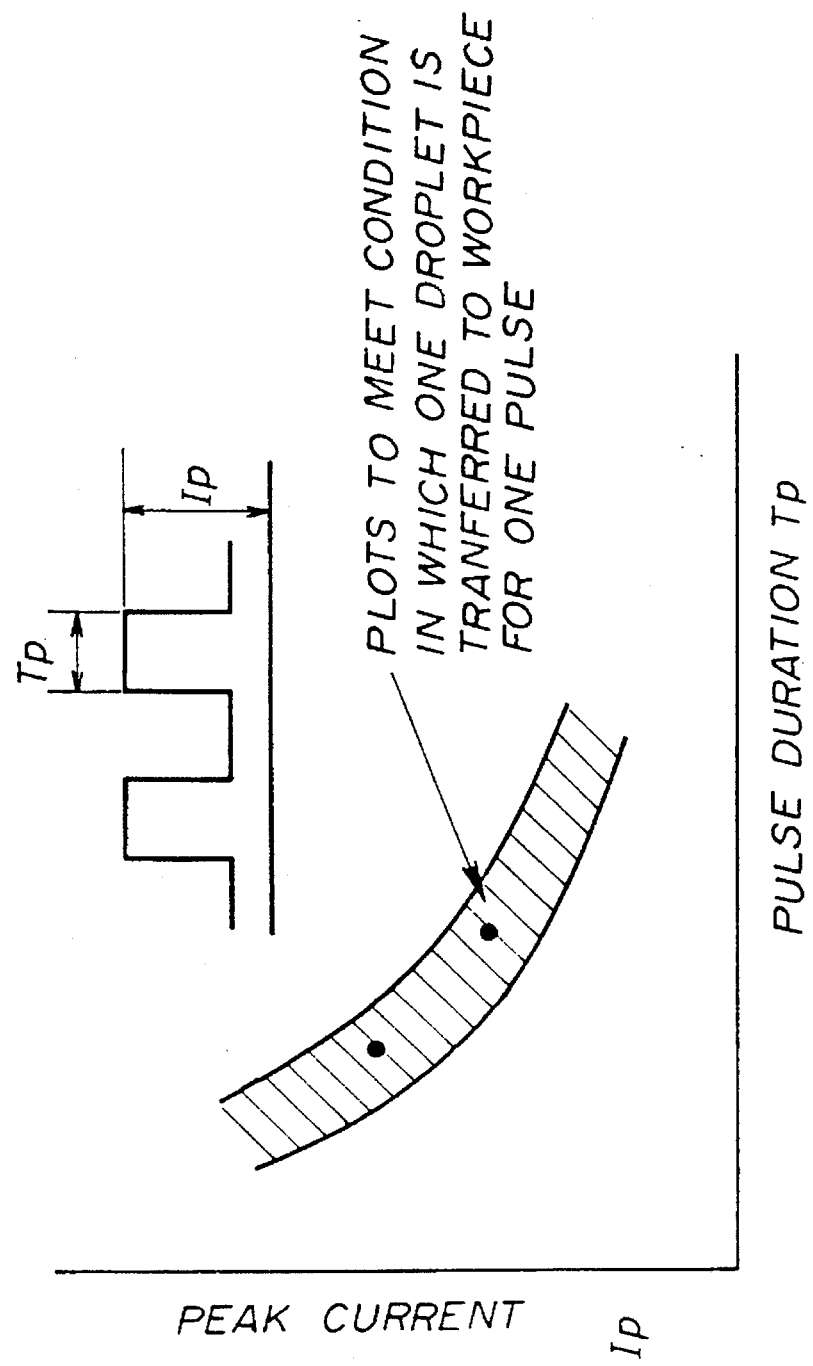

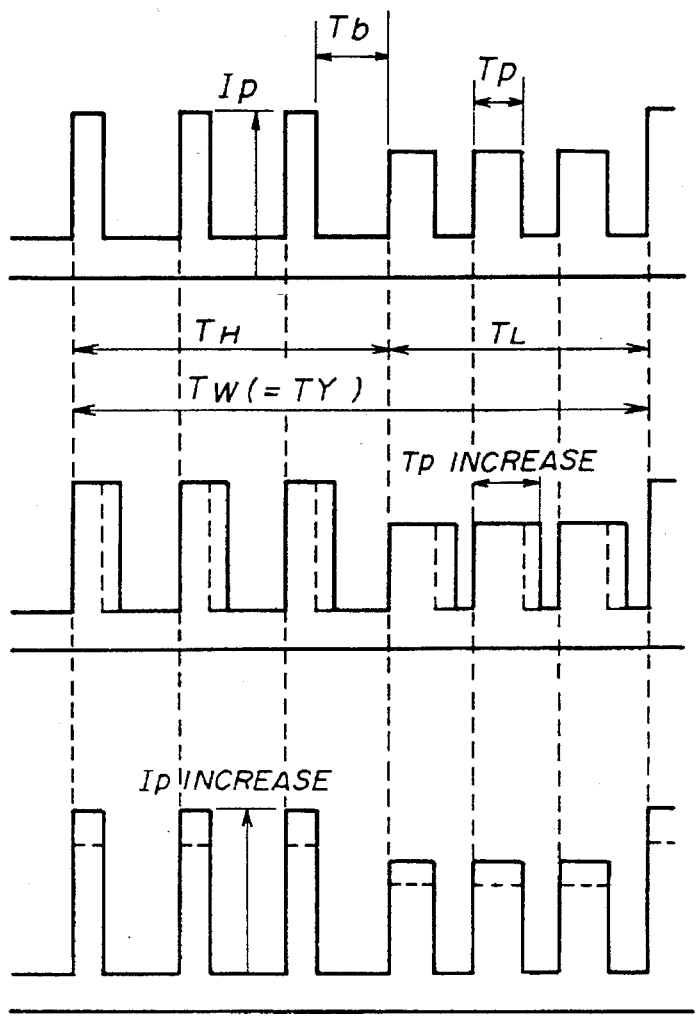

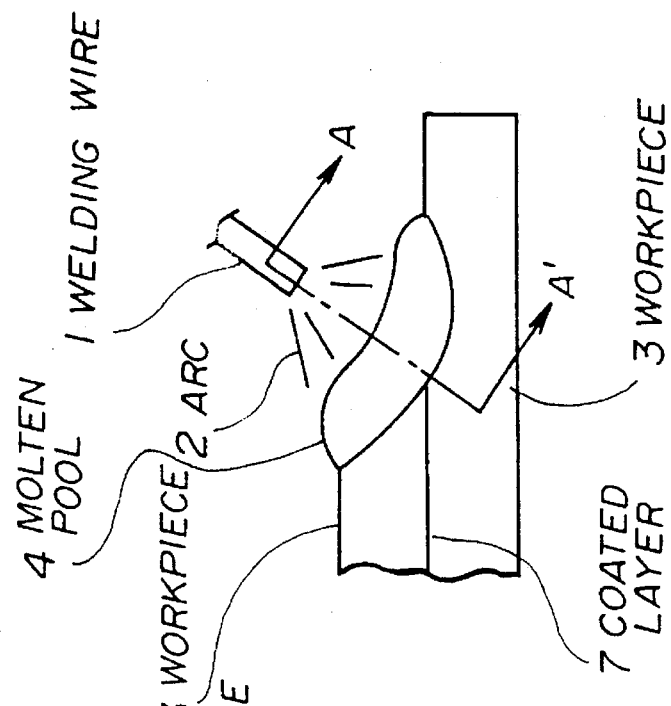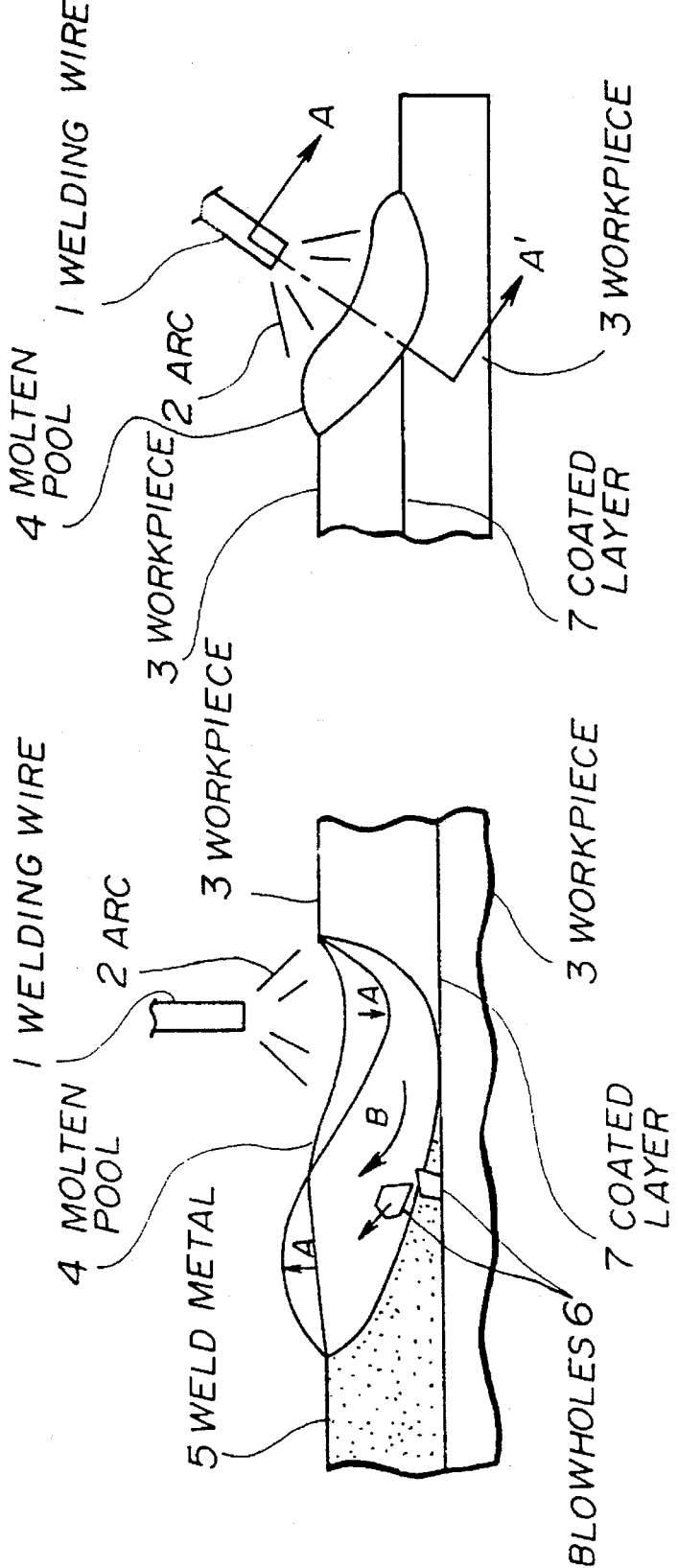

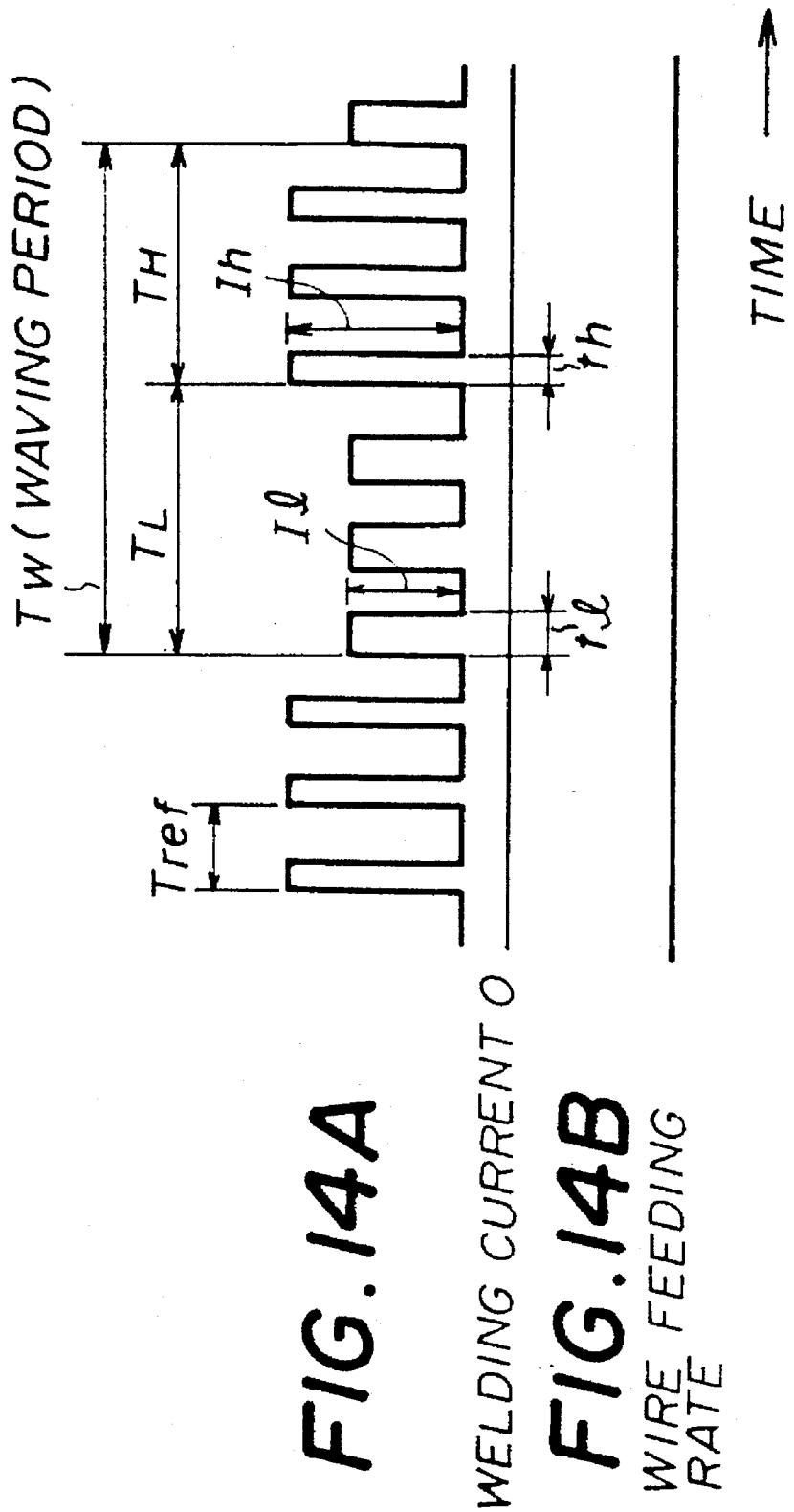

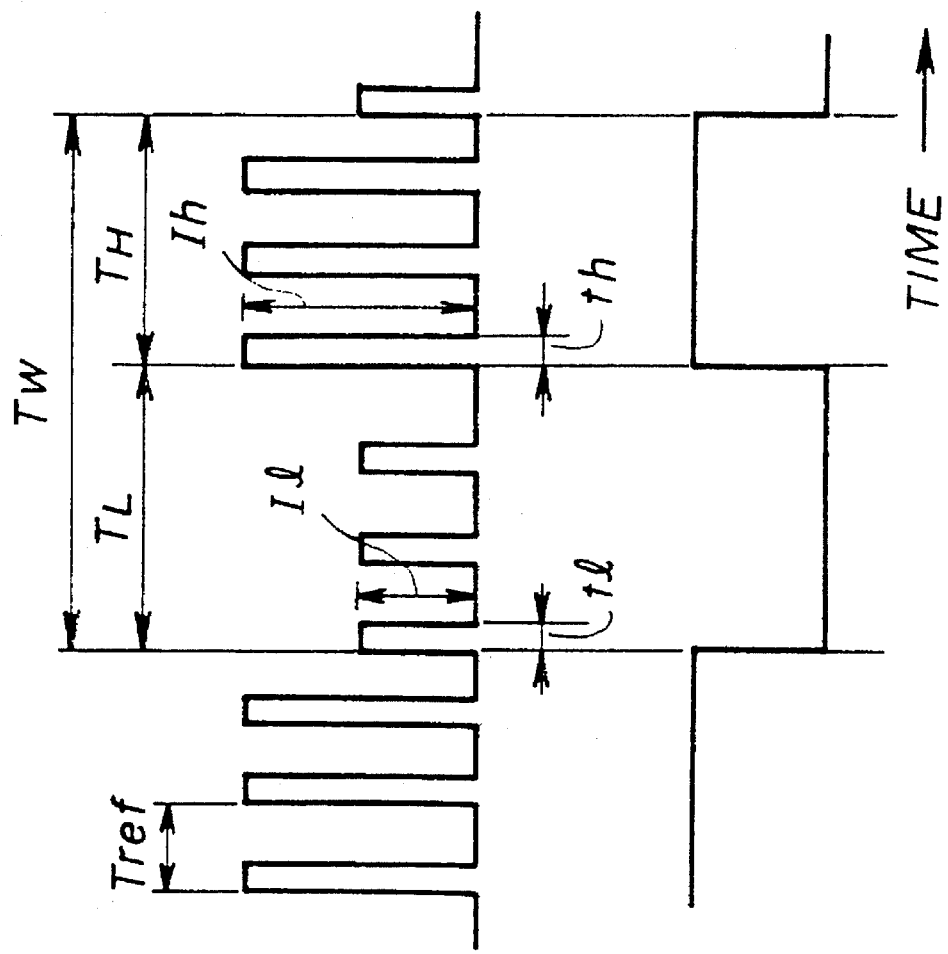
FIG.17A WELDING CURRENT
FIG.17B WIRE FEEDING RATE

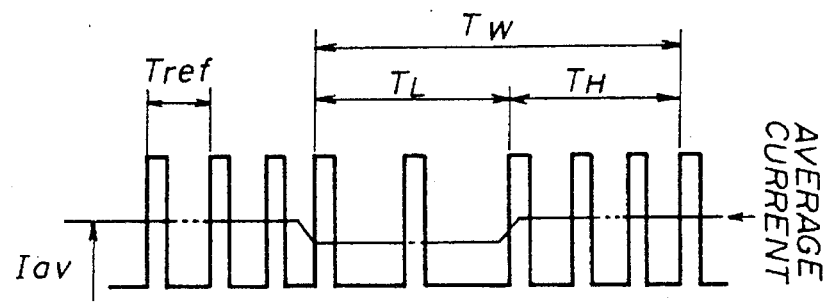
FIG.18A
WELDING CURRENT
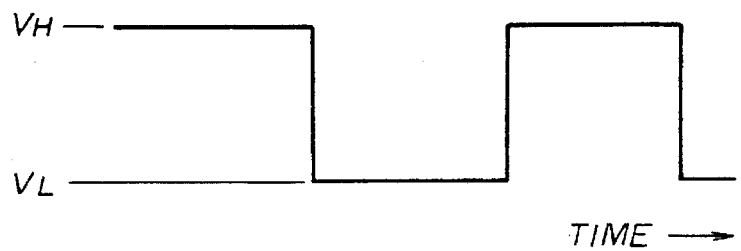
FIG.18B
WIRE FEEDING RATE
FIG.19
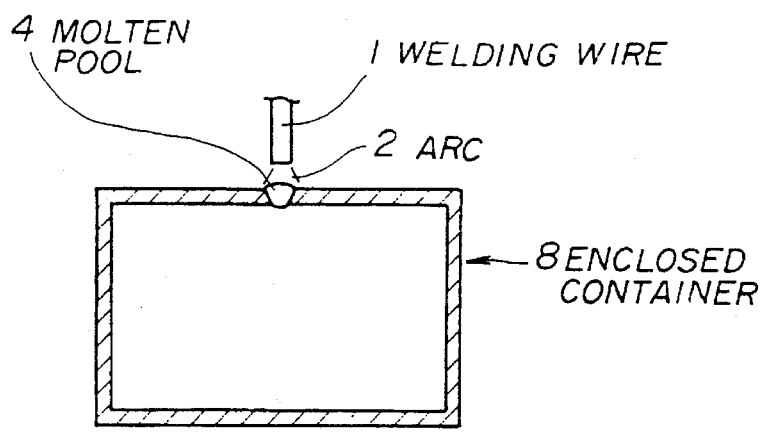

PULSED ARC WELDING APPARATUS HAVING A CONSUMABLE ELECTRODE WIRE

BACKGROUND OF THE INVENTION

(1) Field of the Invention

The present invention generally relates to a pulsed arc welding apparatus, and more particularly to a pulsed arc welding apparatus having a consumable electrode wire wherein a workpiece is welded with the electrode wire located within a shield gas, by supplying a pulsed arc welding current to the electrode wire.

(2) Description of the Related Art

It is known that when a pulsed arc welding is performed to weld a workpiece by using a consumable welding wire an electromagnetic arc force due to the arc current is applied to the workpiece.

If the workpiece has portions with various thicknesses to be welded, it is likely that a thin portion of the workpiece may completely melt by the heat of arc at the end of the wire through the pulsed arc welding and become undesirably perforated at the weld portion. In order to eliminate this problem, it is necessary to reduce the electromagnetic arc force. In the case of a conventional pulsed arc welding apparatus, the peak current or the duty ratio of a peak pulse time within a total duty-cycle time for a thin portion of the workpiece is reduced to a smaller value than a value of the peak current or the duty ratio of a peak pulse time within a total duty-cycle time for a thick portion of the workpiece.

However, in the conventional pulsed arc welding apparatus, the peak current must be preset prior to the start of the welding operation. It is known that the arc discharged between the wire and the workpiece will become unstable as the peak current is changed to a smaller value. The arc length between the wire and the workpiece will not be stabilized if the discharged arc becomes unstable. If the arc length is not stable, it is likely that undesired spatter and weld-bead problems may be produced by the conventional pulsed arc welding apparatus.

For these reasons, in the conventional pulsed arc welding apparatus, the peak current is preset to a relatively great value, and the duty ratio of a peak pulse within a total duty-cycle time is predetermined so as to control the arc force appropriate for a weld portion.

However, when the welding of a workpiece having portions with various thicknesses is performed, it is likely that undesired spatters and weld bead problems appear. If the duty cycle is reduced to a smaller value at the time of the welding of a thin portion of the workpiece, the average current needed to discharge the arc between the wire and the workpiece cannot be maintained at a desired current. It is difficult, with the conventional pulsed arc welding apparatus, to transfer a droplet from the welding wire to the workpiece for one pulse at an appropriate rate. As a result, an adequate thickness for a weld joint may not be obtained and the mechanical strength of the resulting weld joint may be deteriorated.

SUMMARY OF THE INVENTION

Accordingly, it is a general object of the present invention to provide an improved pulsed arc welding apparatus in which the above described problems are eliminated.

Another, more specific object of the present invention is to provide a pulsed arc welding apparatus which determines the optimum pulse form, including a peak current and a pulse duration for each of pulses of the welding current, based on a desired average current, and carries out a pulsed arc welding process appropriate for a workpiece having weld portions with various thicknesses by supplying the welding current in the optimum pulse form to the welding wire.

A further object of the present invention is to provide a pulsed arc welding apparatus which can maintain the waving period including a first pulse period relating to a high peak current and a second pulse period relating to a low peak current, when the average current is changed in accordance with a weld portion thickness change, so that the waving period is equal to a natural period with which the molten pool of the workpiece can be effectively oscillated by the welding wire, and the pulse period of the welding current remains unchanged.

A further object of the present invention is to provide a pulsed arc welding method which can efficiently prevent the inclusion of blowholes in a weld joint during the welding and can increase the strength of the weld joint when a steel sheet including a blowhole-inducing component material is welded.

These and other objects of the present invention are achieved by a pulsed arc welding apparatus which includes: a consumable electrode wire which is fed toward a workpiece at a wire feeding rate; a power supply for supplying a welding current to the wire so as to produce a droplet at the end of the wire by the heat of arc; a pulse form setting part for setting a pulse form of the welding current supplied by the power supply, based on a peak current and a pulse duration; an optimum pulse determining part for determining a peak current and a pulse duration for each of pulses of the welding current based on an average current and for supplying the peak current and the pulse duration to the pulse form setting part so that each respective peak current and each respective pulse duration of the welding current supplied to the wire have a minimum value needed to transfer a droplet from the wire to the workpiece for each pulse at a rate synchronous with the wire feeding rate; and an average current setting part for setting the average current based on the wire feeding rate and for supplying the desired average current to the optimum pulse determining part.

These and other objects of the present invention are achieved by a pulsed arc welding apparatus which includes: a consumable electrode wire which is fed toward a workpiece at a wire feeding rate; a power supply for supplying a welding current to the wire to produce a droplet at the end of the wire by the heat of arc; a pulse form setting part for setting a pulse form of the welding current supplied by the power supply based on a reference pulse form; a reference pulse setting part for determining a first pulse period relating to each of first pulses with a relatively high peak current and a second pulse period relating to each of second pulses with a relatively low peak current based on an average current and a waving period, and for determining peak current values and pulse duration values, relating to the first and second pulses, based on a resonant oscillation amplitude and a peak current difference, so that a reference pulse form is set by the first and second pulse periods, the peak current values and the pulse duration values, and for supplying the reference pulse form to the pulse form setting part; an arc length detecting part for detecting an arc length by measuring a voltage difference between the wire and the workpiece; and a pulse current control part for adjusting the peak current values and the pulse duration values relating to the first and second pulses in response to the arc length detected by the arc length detecting part, and for supplying the peak current values and the pulse duration values to the reference pulse setting part, so that the pulse form of the welding current supplied by the power supply is adjusted in accordance with the arc length detected by the arc length detecting part.

According to the present invention, it is possible to supply to the consumable electrode wire a pulsed arc welding current arranged in the optimum pulse form for performing an appropriate welding of each of the workpiece weld portions with various thicknesses. The arc between the wire and the workpiece is suitably controlled by such welding current supplied to the wire. The pulsed arc welding apparatus according to the present invention can provide a good bead appearance and an adequate weld strength when the weld portions of the workpiece have various thicknesses.

BRIEF DESCRIPTION OF THE DRAWINGS

The above and other objects, features and advantages of the present invention will become more apparent from the following detailed description when read in conjunction with the accompanying drawings in which:

FIG. 11 is a chart showing the plots of the peak current and the pulse duration to meet the condition in which one droplet is transferred from the wire to the workpiece for one pulse;

FIGS. 12A through 12C are diagrams showing the pulse forms of the welding current set by a pulse form setting part of the pulsed arc welding machine in FIG. 10;

FIGS. 13A and 13B are diagrams for explaining the operation of a pulsed arc welding method according to the present invention;

FIGS. 14A and 14B are time charts showing a welding current pulse form and a wire feeding rate used to perform the pulsed arc welding method of the present invention;

FIGS. 17A and 17B are time charts showing a welding current pulse form and a wire feeding rate when the average current is changed;

FIGS. 18A and 18B are time charts showing a welding current pulse form and a wire feeding rate when the wire feeding rate is changed;

FIG. 19 is a diagram for explaining a procedure for welding an enclosed container performed by the pulsed arc welding method of the present invention;

DESCRIPTION OF THE PREFERRED EMBODIMENTS

A description will now be given, with reference to FIGS. 1 through 4B, of a first embodiment of the pulsed arc welding apparatus according to the present invention.

Figure 1:
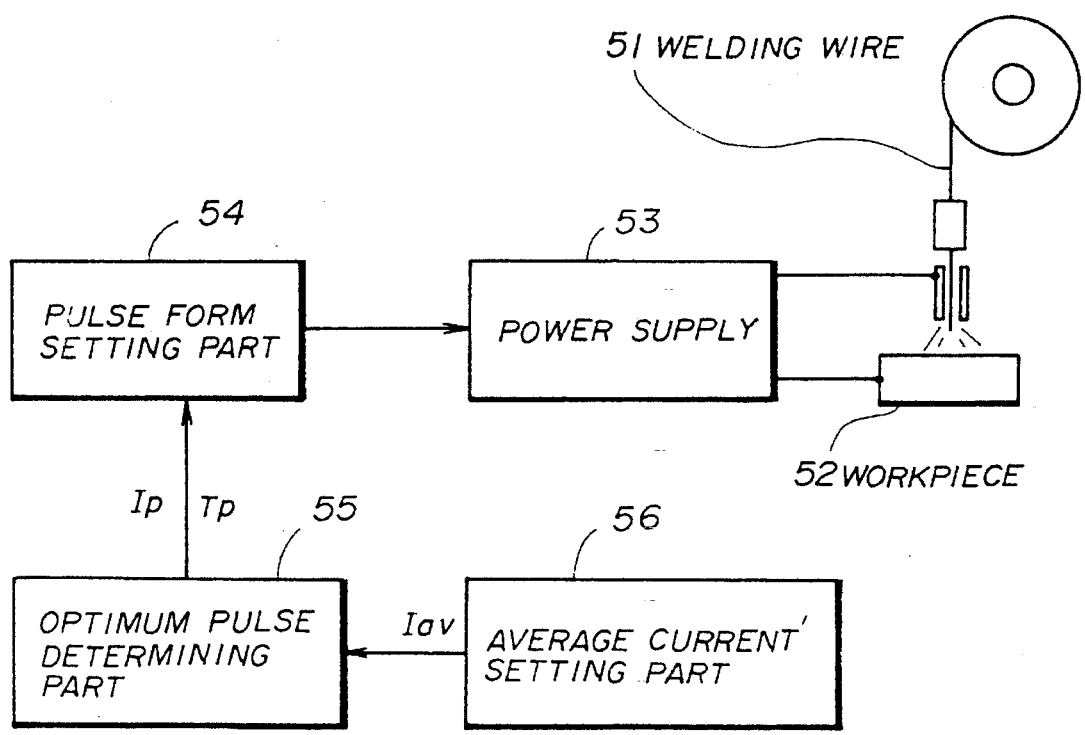
FIG. 1 is a block diagram showing a first embodiment of a pulsed arc welding apparatus according to the present invention.

FIG. 1 shows the first embodiment of the pulsed arc welding apparatus according to the present invention. In FIG. 1, a power supply 53 supplies a welding current to a welding wire 51 (a consumable electrode wire) so as to produce a droplet at the end of the welding wire 51 by the heat of arc and transfer the droplet to a workpiece 52 at a rate synchronous with a wire feeding rate. A pulse form setting part 54 sets a pulse form of the welding current supplied from the power supply 53, based on a peak current Ip of the welding current and a pulse duration Tp thereof. An optimum pulse determining part 55 determines the peak current Ip and the pulse duration Tp based on a desired average current Iav supplied from an average current setting part 56, so that the respective pulses of the welding current have a minimum, necessary value to transfer one droplet from the welding wire 51 to the workpiece 52 for each of the pulses of the welding current at a rate synchronous with the wire feeding rate. The average current setting part 56 sets the desired average current Iav so that it sustains the wire feeding rate of the welding wire 51 appropriate for obtaining an adequate weld strength and a good bead appearance.

Figure 2:
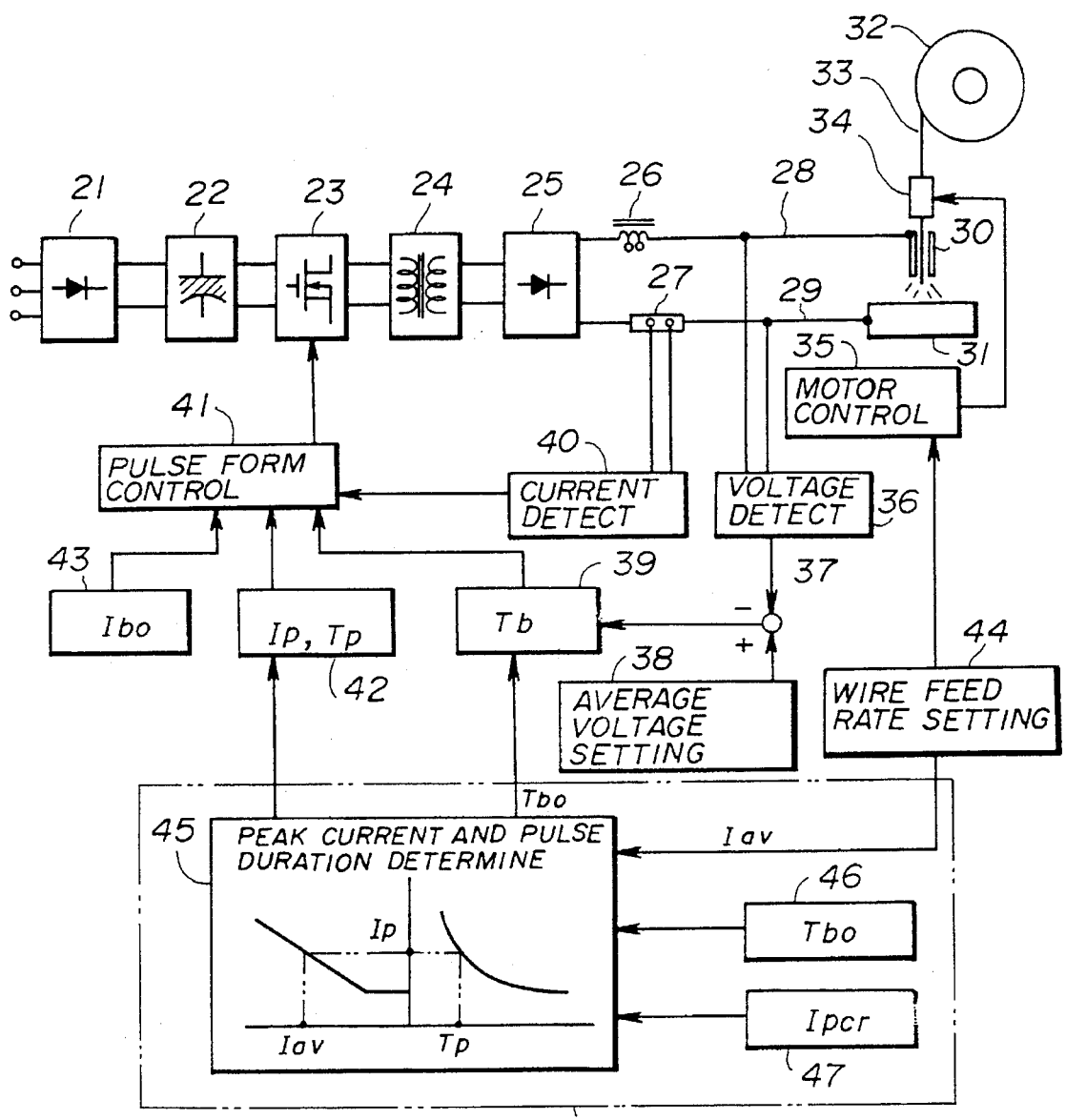
FIG. 2 is a diagram showing a pulsed arc welding machine to which the present invention is applied.

FIG. 2 shows a pulsed arc welding machine to which the present invention is applied. In FIG. 2, a rectifier 21, a smoothing circuit 22 and an inverter 23 are provided on the primary current side of a high frequency transformer 24. These parts and the high frequency transformer 24 serve as the power supply that supplies power to a welding wire 33 which is a consumable electrode wire. The output of the rectifier 21 is connected to the input of the smoothing circuit 22, and the output of the smoothing circuit 22 is connected to the input of the inverter 23. The inverter 23 serves to arrange a welding current having a desired pulse form based on a signal supplied from a pulse form control part 41 (which will be described later), and the inverter 23 supplies the arranged welding current to the input of the transformer 24.

The output of the transformer 24 on the secondary current side has a positive terminal and a negative terminal, and the output of the transformer 24 is connected to the input of a rectifier 25 shown in FIG. 2. A positive terminal at the output of the rectifier 25 is connected to a contact tip 30 via a rectifier 25. The positive terminal at the output of the rectifier 25 is connected to a contact tip 30 via a power cable 28, and the power cable 28 has a reactor 26 connected in series. The negative terminal at the output of the rectifier 25 is connected to a workpiece 31 via a power cable 29, and the power cable 29 has a shunt 27 connected in series.

A welding wire 33 which is a consumable electrode wire used by the welding machine is fed from a wire reel 32, and the welding wire 33 is inserted in the contact tip 30. The leading edge of the welding wire 33 is placed near the workpiece 31 through the center axis of the contact tip 30. The welding wire 33 within the contact tip 30 is electrically conductive with the power cable 28, and the power is supplied from the power supply to the welding wire 33 so as to discharge the arc between the workpiece 31 and the welding wire 33.

The welding wire 33 is fed to the workpiece 31 at a wire feeding rate by means of a pair of feeding rollers 34, and the feeding rollers 34 are rotated by a motor (not shown). A motor control unit 35 is provided for controlling the rotation of the motor to feed the welding wire 33 at the wire feeding rate. The output of the motor control unit 35 is connected to the motor, and the rotating speed of the motor is controlled according to a control signal supplied from the motor control unit 35. Thus, the wire feeding rate of the welding wire 33 is determined by the signal supplied from the motor control unit 31.

In the pulsed arc welding machine in FIG. 2, a three-phase alternating current is supplied to the rectifier 21, and the alternating current is converted into direct current at the output of the smoothing circuit 22. The direct current input to the inverter 23 becomes the base current on which the pulsed arc welding current output from the transformer 24 is superimposed.

The pulse form of the current (or the peak current and the pulse duration) at the input of the transformer 24 is arranged in accordance with a signal supplied from the pulse form control part 41. The primary current input to the transformer 24 is subjected to the voltage transformation, and it is converted into a secondary current. The secondary current at the output of the transformer 24 is subjected to the rectification by the rectifier 25. At the output of the rectifier 25, the pulsed arc current appears in which the base current supplied from the smoothing circuit 22 and the optimum pulse current supplied from the pulse form control part 41 are superimposed.

The stream of the welding current in which the above pulses repeat at controlled intervals is continuously supplied to the welding wire 33. The arc is discharged between the welding wire 33 and the workpiece 31 to produce a droplet by the heat of the arc for each respective pulse. According to the present invention, the pulse form of the welding current is controlled to transfer the droplet from the welding wire 33 to the workpiece 31 at a rate synchronous with the wire feeding rate determined by the motor control part 35.

In the pulsed arc welding machine shown in FIG. 2, a voltage detector 36 is connected to both the power cables 28 and 29 in parallel so as to detect a voltage difference between the power cables 28 and 29. This voltage difference indicates the arc voltage between the welding wire 33 and the workpiece 31. Generally, the length of the arc from the leading edge of the welding wire 33 to the workpiece 31 is varied depending on the arc voltage. Therefore, in order to maintain the length of the arc at a constant length, it is necessary to maintain the voltage applied to the welding wire (or the voltage difference between the power cables 28 and 29) at a constant level.

The voltage detector 36 supplies a signal indicating the detected voltage difference to one input of a voltage comparator 37. An average voltage setting part 38 is connected to the other input of the voltage comparator 37. The average voltage setting part 38 supplies a given reference voltage to the other end of the voltage comparator 37. The voltage comparator 37 compares the voltage difference from the voltage detector 36 with the reference voltage from the average voltage setting part 38, and it supplies a signal indicating the result of the comparison to a base duration setting part 39.

The base duration setting part 39 sets the base duration Tb of the welding current based on the signal supplied from the voltage comparator 37. Thus, the base duration Tb of the welding current is set by the base duration setting part 39 so as to maintain the measured voltage difference between the power cables 28 and 29 (or the welding current between the welding wire 33 and the workpiece 31) at a level according to the reference voltage from the average voltage setting part 38.

In the pulsed arc welding machine in FIG. 2, a current detector 40 is connected to the shunt 27 provided on the power cable 29. This current detector 40 detects the current across the shunt 27, and the detected current is the arc welding current used to discharge the arc between the welding wire 33 and the workpiece 31. The current detector 40 supplies a signal indicating the measured arc current to the pulse form control part 41.

In the pulsed arc welding machine in FIG. 2, the base duration setting part 39 supplies a value of the base duration Tb to the pulse form control part 41. A pulse determining part 45 (which will be described later) determines values of the peak current Ip and the pulse duration Tp based on the average current Iav. A setting part 42 supplies the values of the peak current Ip and the pulse duration Tp, determined by the pulse determining part 45, to the pulse form control part 41. A base current setting part 43 sets a value of the base current Ibo and supplies it to the pulse form control part 41.

The pulse form control part 41 in FIG. 2 determines a pulse form of the welding current based on the base duration value (Tb), the peak current value (Ip), the pulse duration value (Tp) and the base current value (Ibo). The pulse form control part 41 compares the welding current having the determined pulse form with the measured welding current supplied from the current detector 36, and the pulse form control part 41 supplies a signal indicating the result of the comparison to the inverter 23. The welding current supplied by the inverter 23 to the transformer 24 is controlled by the pulse form control part 41 so as to make the welding current to suit a measured welding current change. The pulse form of the welding current is set by: the base duration Tb from the base duration setting part 39; the peak current Ip and pulse duration Tp from the setting part 42; and the base current Ibo from the base current setting part 43.

For example, when the arc length between the welding wire end and the workpiece is relatively small, the voltage difference between the power cables is detected by the voltage detector 36 as being lower than the reference voltage from the average voltage setting part 38. In response to this, the base duration setting part 39 sets the base duration Tb to be a smaller value. The welding current is controlled by the pulse form control part 41 so as to increase the average of the welding current so that the welding wire 33 is more rapidly consumed. Thus, the arc length between the welding wire end and the workpiece is increased so that it will become a greater arc length.

On the other hand, when the arc length is relatively great, the voltage difference is detected as being higher than the reference voltage. In response to this, the base duration setting part 39 sets the base duration Tb to be a greater value. The welding current is controlled so as to reduce the average of the welding current. Thus, the distance between the welding wire end and the workpiece, or the arc length therebetween, is reduced so that it will become smaller.

The base current Ibo supplied to the pulse form control part 41 is set by the base current setting part 43 as the minimum current necessary to sustain the discharging of the arc between the welding wire and the workpiece. The base current Ibo is preset to a fixed value, and it is determined depending on the material of the electrode wire and on the material of the shield gas.

The pulse determining part 45 of the pulsed arc welding machine in FIG. 2 corresponds to the optimum pulse determining part 55 of the pulsed arc welding apparatus in FIG. 1. The pulse determining part 45 determines the peak current Ip and the pulse duration Tp based on the average current Iav in a manner such that the arc welding is performed with a determined peak current and pulse duration for transferring one droplet from the welding wire to the workpiece for each of the pulses of the welding current at a rate synchronous with the wire feeding rate. The average current Iav is set so that it can sustain the wire feeding rate of the welding wire 33 appropriate for obtaining an adequate weld strength and a good bead appearance. According to the present invention, the arc welding is performed with a welding current having the determined peak current and pulse duration, and it is possible to transfer one droplet from the welding wire to the workpiece at an appropriate rate for each of the pulses of the welding current. It is possible for the pulsed arc welding apparatus to obtain a good bead appearance and an adequate weld strength.

Figure 3A:
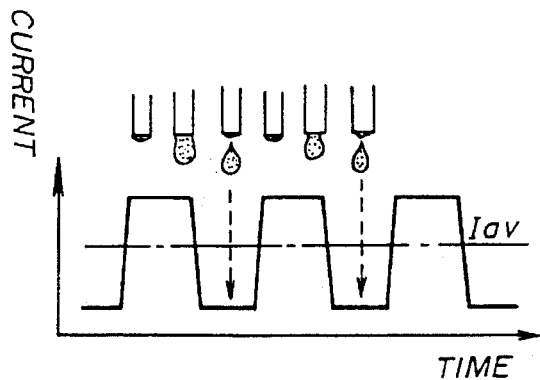
FIGS. 3A and 3B are diagrams showing the operation of the pulsed arc welding machine for explaining the necessity of setting of a minimum base duration when the average current is reduced.
Figure 3B:
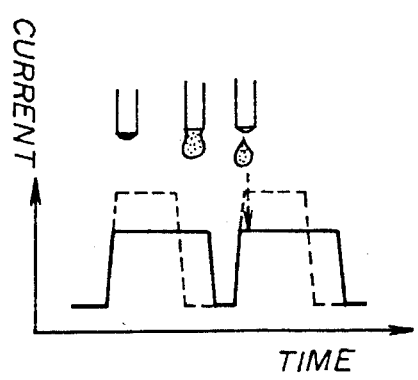

Generally, it is desirable that the peak current Ip and the pulse duration Tp determined by the pulse determining part 45 are always values appropriate for transferring one droplet from the welding wire to the workpiece at a rate synchronous with the wire feeding rate for each of the pulses of the welding current. This is shown in FIG. 3A. For this reason, when the average current Iav is a relatively great value, the pulse determining part 45 reduces the peak current Ip to the minimum necessary value for sustaining the average current Iav. The peak current Ip can be reduced to the minimum necessary value while the pulse duration Tp is changed to be as great as the maximum value and the base duration Tb is changed to be as small as the minimum value. However, if the base duration Tb is changed to an excessively small value so as to reduce the peak current Ip, it is impossible to transfer one droplet from the welding wire to the workpiece at an appropriate rate, as shown in FIG. 3B.

In order to eliminate the above mentioned problem, a minimum base duration setting part 46 is provided in the pulsed arc welding machine in FIG. 2 for setting the minimum value Tbo of the base duration to be supplied to the pulse determining part 45. Thus, the base duration Tb relating to the pulse form of the welding current determined by the pulse determining part 45 is always set to be equal to or greater than the minimum base duration Tbo supplied from the minimum base duration setting part 46, so that a droplet is stably transferred from the wire to the workpiece at an appropriate rate.

Figure 4A:
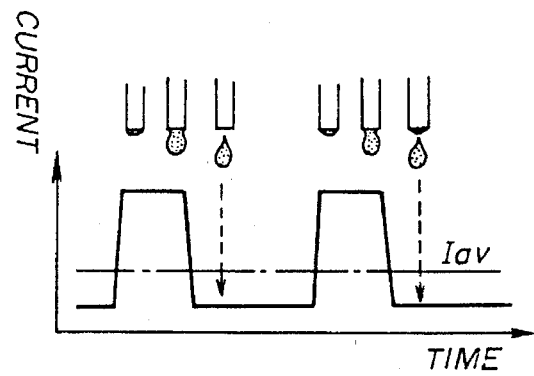
FIGS. 4A and 4B are diagrams showing the operation of the pulsed arc welding machine for explaining the necessity of setting of a critical peak current when the average current is reduced.

When the average current Iav is a relatively small value, the pulse determining part 45 increases the base duration Tb and reduces the number of the pulses of the welding current per unit time, to ensure that one droplet is transferred from the welding wire to the workpiece at an appropriate rate, as shown in FIG. 4A. The base duration Tb is set to be equal to or greater than the minimum base duration Tbo. The pulse determining part 45 determines the peak current Ip in accordance with the minimum base duration Tbo.

Figure 4B:
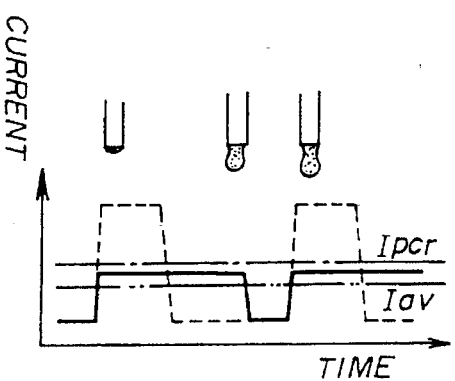

Generally, the peak current Ip can be set to a smaller value when the pulse duration Tp is increased to be as great as possible. However, if the pulse duration Tp is increased to be excessively large, it is impossible to transfer one droplet from the welding wire to the workpiece at an appropriate rate, as shown in FIG. 4B.

In order to eliminate the above mentioned problem, a critical peak current setting part 47 is provided in the pulsed arc welding machine in FIG. 2 for setting the critical value of the peak current Ip to be supplied to the pulse determining part 45. Thus, the peak current Ip relating to the pulse form of the welding current determined by the pulse determining part 45 is always set to be equal to or greater than the critical peak current value Ipcr from the critical peak current setting part 47 when the average current Iav is relatively small. The pulse determining part 45 determines the pulse duration Tp in accordance with the thus determined peak current Ip so as to transfer one droplet from the welding wire to the workpiece at an appropriate rate. Thus, the pulsed arc welding machine in FIG. 2 can transfer one droplet from the welding wire to the workpiece at an appropriate rate when the average current Iav is relatively small.

Next, a description will be given with reference to FIGS. 5 through 8 of the operation of the pulse determining part 45 shown in FIG. 2. The peak current Ip and the pulse duration Tp supplied from the pulse determining part 45 are used to set the optimum pulse form of the arc welding current to be supplied to the welding wire 33.

Figure 5:
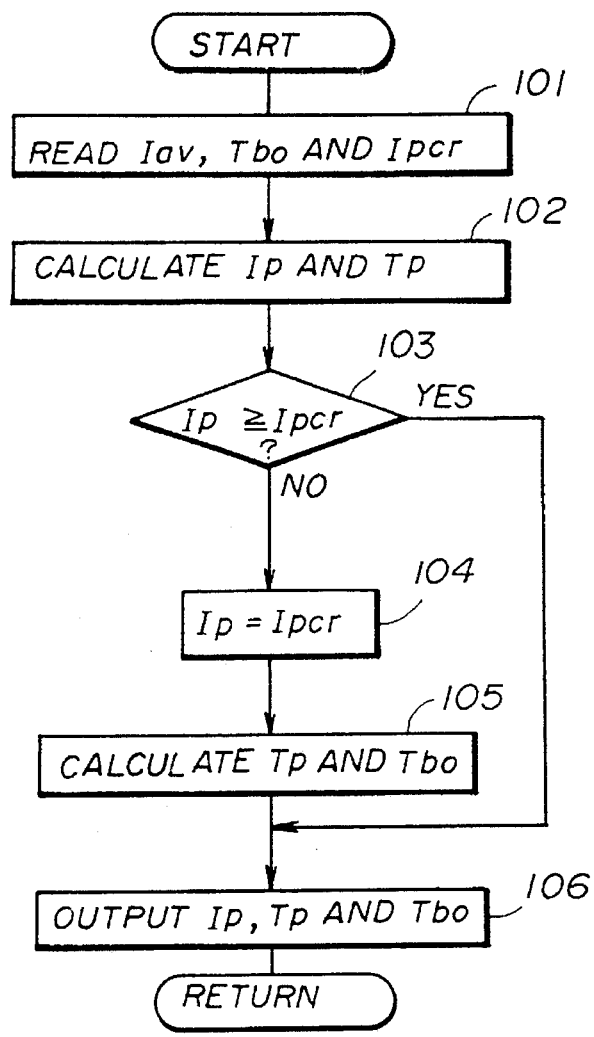
FIG. 5 is a flow diagram for explaining the operation of a pulse determining part of the pulsed arc welding machine in FIG. 2.

FIG. 5 shows the operation of the pulse determining part 45 to determine the peak current Ip and the pulse duration Tp of the welding current. The pulse determining part 45 determines the base duration Tb, the peak current Ip and the pulse duration Tp, based on the average current Iav, the minimum base duration Tbo and the critical peak current Ipcr. The pulse determining part 45 outputs the base duration Tb to the base duration setting part 39, and the pulse determining part 45 outputs the peak current Ip and the pulse duration Tp to the setting part 42.

At the start of the operation of the pulse determining part 45 in FIG. 5, step 101 is performed. Step 101 reads the average current Iav from the wire feeding rate setting part 44, reads the minimum base duration Tbo from the minimum base duration setting part 46, and reads the critical peak current Ipcr from the critical peak current setting part 47.

After step 101 is performed, step 102 determines the peak current Ip based on the average current Iav read from the wire feeding rate setting part 44, and determines the pulse duration Tp in accordance with the peak current Ip so as to ensure that one droplet is transferred from the welding wire to the workpiece at an appropriate rate.

Figure 6:
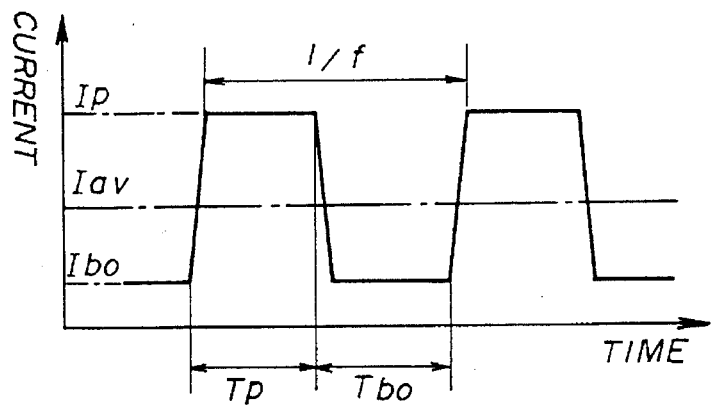
FIG. 6 is a chart showing the pulse form of the welding current set by a pulse form setting part of the pulsed arc welding machine in FIG. 2.

An example of the pulse form of the welding current determined by the pulse determining part 45 is shown in FIG. 6. The pulse form of the welding current can be appropriately determined by the pulse determining part 45 if the peak current Ip and the pulse duration Tp are determined. Generally, the average current Iav can be represented by the following equation:

$$Iav = k \cdot f(Ip \cdot Tp + Ibo \cdot Tbo) \quad (1)$$

where k denotes a given coefficient, f denotes a pulse frequency, Ibo denotes the minimum base current needed to continue the arc welding, and Tbo denotes the minimum base duration determined depending on the material of the welding wire and on the diameter of the welding wire.

The minimum base current Ibo used in this embodiment is equal to 50 A. In this embodiment, a steel electrode wire with the outside diameter of 1.2 mm is used as the welding wire 33, and the minimum base duration Tbo is preset to approximately 0.5 seconds.

Figure 7:
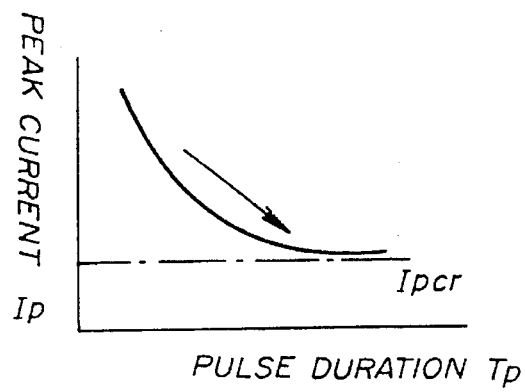
FIG. 7 is a chart showing the relationship between the peak current, the pulse duration and the critical peak current.

It is known that, in order to smoothly transfer one droplet from the welding wire to the workpiece for each of the pulses of the welding current, the following relationship between the peak current Ip and the pulse duration Tp must be satisfied.

$$(Ip)^a \cdot Tp = \text{constant} \quad (2)$$

where "a" is a peak current exponent. The value of the peak current exponent "a" can be determined through experiment, and the value is usually in a range between 1.5 and 2.0. FIG. 7 shows the relationship between the pulse duration Tp and the peak current Ip pursuant to the relationship (2). The critical peak current Ipcr is indicated in the chart in FIG. 7.

The pulse frequency is the rate at which a pulse form action repeats. Based on this definition, the pulse frequency f in the equation (1) is represented as follows.

$$f = 1/(Tp + Tbo) \quad (3)$$

At step 102 shown in FIG. 5, the pulse determining part 45 determines the peak current Ip and the pulse duration Tp based on the average current Iav pursuant to the above equations (1) and (2). Additionally, the pulse determining part 45 determines the pulse frequency f pursuant to the above equation (3).

After step 102 is performed, step 103 is performed. Step 103 detects whether the peak current Ip determined at step 102 is greater than the critical peak current Ipcr at step 101.

If the result at step 103 is negative (Ip<Ipcr), the function to transfer one droplet from the welding wire to the workpiece for one pulse of the welding current at an appropriate rate cannot be attained because the peak current Ip is not greater than the critical peak current Ipcr. At this time, steps 104 and 105 are performed. Step 104 sets the peak current Ip to be equal to the critical peak current Ipcr. Step 105 determines the pulse duration Tp corresponding to the peak current Ip (=Ipcr) at step 104, and determines the base duration Tbo based on the pulse duration Tp pursuant to the above equation (3).

After steps 104 and 105 are performed, step 106 is performed. Step 106 outputs the peak current Ip and the pulse duration Tp to the setting part 42, and outputs the base duration Tbo to the base duration setting part 39. Then, the operation of the pulse determining part 45 in FIG. 5 is temporarily performed.

When the average current Iav is so small that the peak current determined at step 102 is smaller than the critical peak current, the peak current Ip is adjusted to be equal to the critical peak current Ipcr. The base duration Tbo is also adjusted pursuant to the thus determined peak current Ip such that the above relationship (1) will be satisfied with the peak current Ip, the pulse duration Tp and the base duration Tbo.

On the other hand, if the result at step 103 is affirmative (Ip≧Ipcr), step 106 is performed and steps 104 and 105 are not performed. In the present example, the function to transfer one droplet from the welding wire to the workpiece for one pulse of the welding current at an appropriate rate can be attained by using the pulse form of the welding current determined with the peak current Ip and the pulse duration Tp at step 102.

Figure 8:
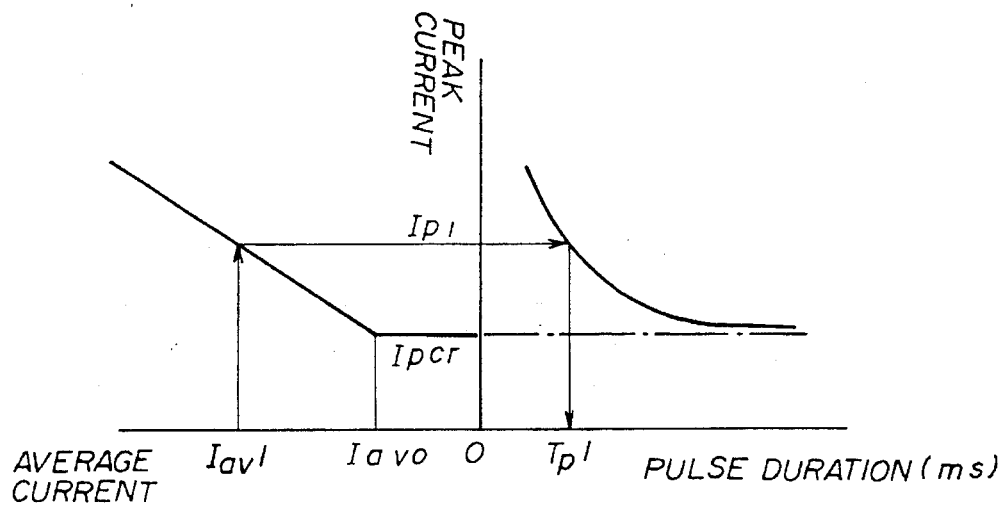
FIG. 8 is a chart for explaining the determination of a peak current value and a pulse duration value based on an average current.

FIG. 8 shows the manner by which the peak current Ip and the pulse duration Tp are determined based on the average current Iav. In FIG. 8, the relationship between the peak current Ip and the pulse duration Tp (according to the equation (2)) is indicated by the right hand graph, and the relationship between the peak current Ip and the average current Iav (according to the equation (1)) is indicated by the left hand graph.

In FIG. 8, when an average current value Iav1 is read from the wire feeding rate setting part 44, the pulse determining part 45 determines a peak current value Ip1 based on the average current value Iav1 in accordance with the left hand graph, as described above at the step 102. Based on this peak current value Ip1, the pulse determining part 45 determines a pulse duration value Tp1 in accordance with the right hand graph in FIG. 8. Thus, the function to transfer one droplet from the welding wire to the workpiece for one pulse at an appropriate rate can be attained with the pulse form of the welding current determined with the peak current value Ip1 and the pulse duration value Tp1.

In FIG. 8, when an average current value which is smaller than a critical average current (corresponding to the critical peak current Ipcr) is read from the wire feeding rate setting part 44, the pulse determining part 45 determines the peak current Ip such that it is equal to the critical peak current Ipcr described at the above step 104. The pulse determining part 45 at this time determines a pulse duration value and a base duration value so as to make the average current equal to or greater than the critical peak current Ipcr.

Next, a description will be given, with reference to FIGS. 9 through 12C, of a second embodiment of the pulsed arc welding apparatus according to the present invention.

Figure 9:
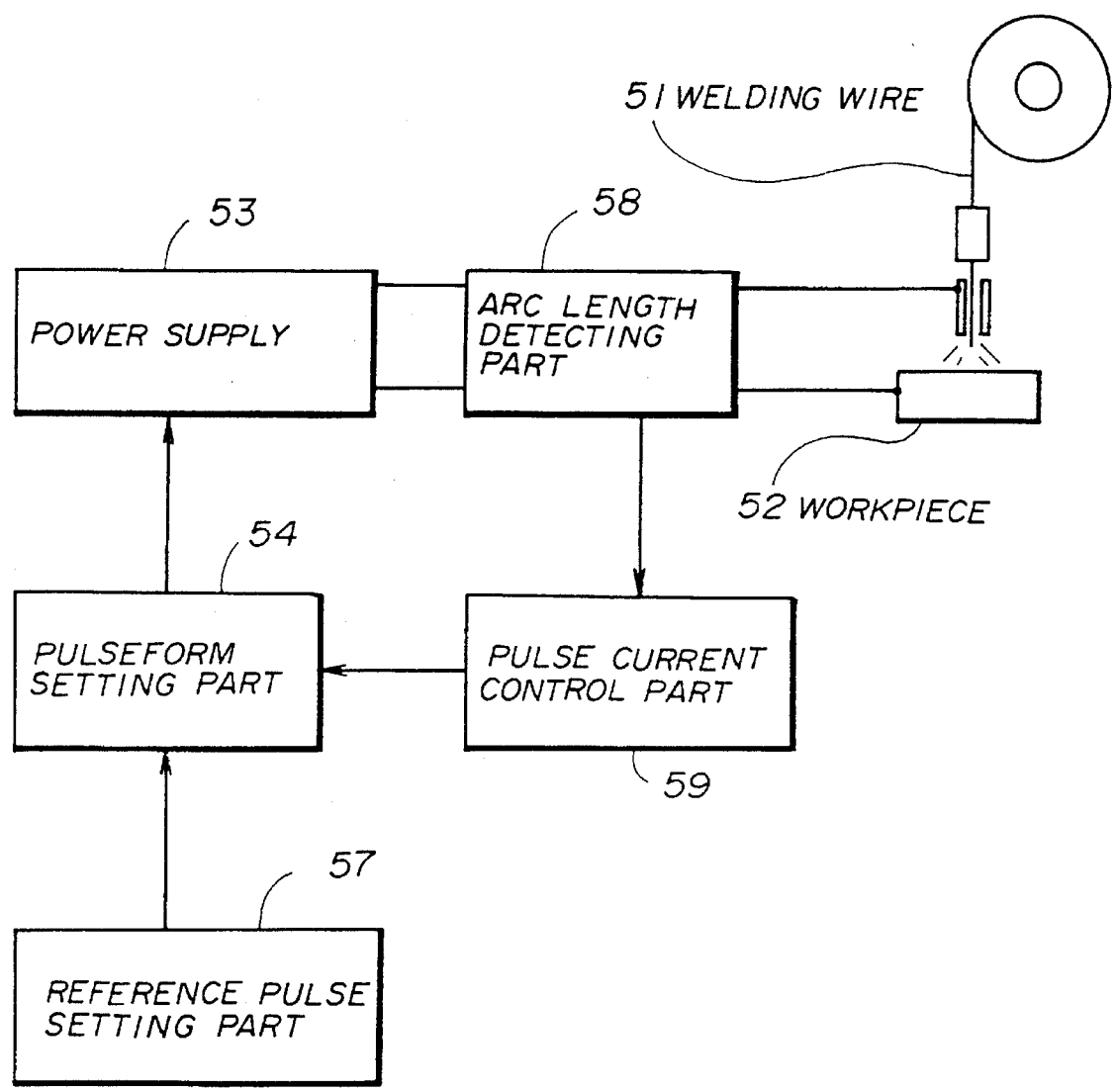
FIG. 9 is a block diagram showing a second embodiment of the pulsed arc welding apparatus according to the present invention.

FIG. 9 shows the second embodiment of the pulsed arc welding apparatus. In FIG. 9, the parts which are the same as corresponding parts in FIG. 1 are designated by the same reference numerals, and a description thereof will be omitted. In the pulsed arc welding apparatus in FIG. 9, the power supply 53 supplies a welding current to the welding wire 51 so as to produce a droplet at the end of the welding wire by the heat of arc. This droplet is transferred from the wire 51 to the workpiece 52 at a rate synchronous with the wire feeding rate. The pulse form setting part 54 sets a pulse form of the welding current supplied by the power supply 53, based on a reference pulse form.

In the pulsed arc welding apparatus in FIG. 9, a reference pulse setting part 57 determines a first pulse period relating to each of first pulses with a relatively high peak current and a second pulse period relating to each of second pulses with a relatively low peak current based on an average current and a waving period. The reference pulse setting part 57 determines peak current values and pulse duration values, relating to the first and second pulses, based on a resonant oscillation amplitude and a peak current difference, so that the reference pulse setting part 57 sets a reference pulse form by the first and second pulse periods, the peak current values and the pulse duration values. The reference pulse setting part 57 supplies the reference pulse form to the pulse form setting part 54.

In FIG. 9, an arc length detecting part 58 detects an arc length by measuring a voltage difference between the wire and the workpiece. A pulse current control part 59 adjusts the peak current values and the pulse duration values relating to the first and second pulses in response to the arc length detected by the arc length detecting part 58. The pulse current control part 59 supplies the peak current values and the pulse duration values to the reference pulse setting part 54, so that the pulse form setting part 54 adjusts the pulse form of the welding current supplied by the power supply 53 in accordance with the arc length detected by the arc length detecting part 58.

According to the present invention, it is possible to adjust the average current supplied to the welding wire in response to a change in the arc length with no need of changing of the pulse frequency of the welding current. It is possible for the pulsed arc welding apparatus to more stably obtain an adequate weld strength and a good bead appearance.

Figure 10:
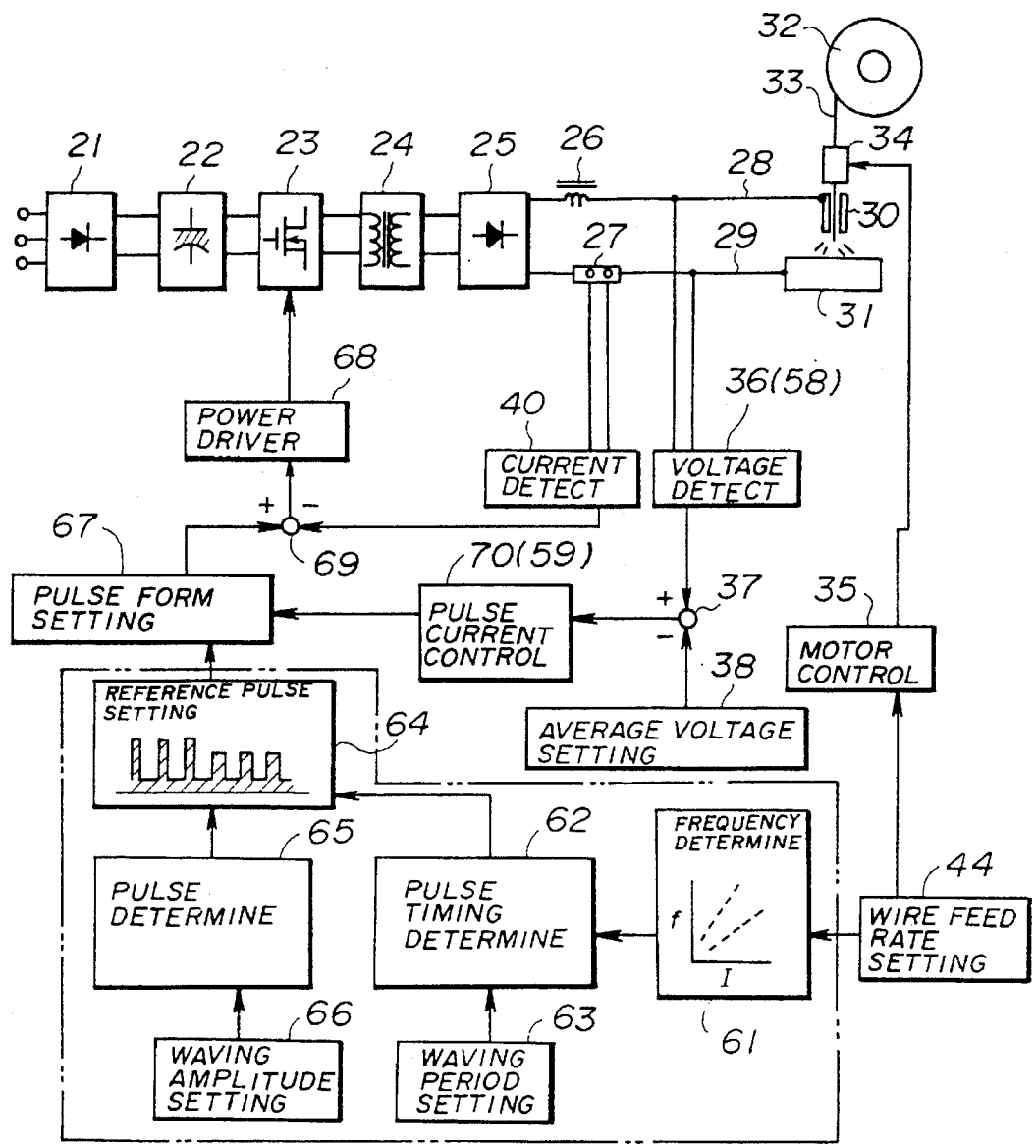
FIG. 10 is a diagram showing a pulsed arc welding machine to which the present invention is applied.

FIG. 10 shows a pulsed arc welding machine to which the present invention is applied. In FIG. 10, the parts which are the same as corresponding parts in FIG. 2 are designated by the same reference numerals, and a description thereof will be omitted.

The pulsed arc welding machine in FIG. 10 is provided with the reference pulse setting part 57 mentioned above, and this reference pulse setting part includes a frequency determining part 61, a pulse timing determining part 62, a waving period setting part 63, a reference pulse setting part 64, a pulse determining part 65 and a waving amplitude setting part 66.

In FIG. 10, the motor control part 35 is connected to the welding wire 33 to control the rotating speed of the motor (not shown) to feed the welding wire 33 at a rate according to a desired wire feeding rate. The wire feeding rate setting part 44 supplies to the motor control part 35 a signal indicating the wire feeding rate needed to weld the workpiece 31 with a weld joint having an adequate strength. The wire feeding rate setting part 44 supplies to the frequency determining part 61 a signal indicating the average current Iav to be supplied to the welding wire 33. This average current Iav is set so that it can sustain the wire feeding rate to be appropriate for obtaining a good bead appearance and an adequate weld strength. Generally, the average current Iav is preset depending on the material of the welding wire and on the diameter of the welding wire.

The frequency determining part 61 determines a pulse frequency f based on the average current Iav supplied from the wire feeding rate setting part 44. This pulse frequency f is the rate at which the pulses of the welding current repeat for unit time. If the average current Iav supplied from the wire feeding rate setting part 44 is known, one can determine the pulse frequency f according to the above equations (1) through (3). Thus, the frequency determining part 61 determines a pulse frequency f based on the average current Iav from the wire feeding rate setting part 44, in accordance with the above equations (1) through (3).

The pulse timing determining part 62 determines a first pulse period TH and a second pulse period TL based on the pulse frequency f from the frequency determining part 61 and based on a given waving period Tw from the waving period setting part 63. During the first pulse period TH first pulses of the welding current with a relatively high peak current are repeated, and during the second pulse period second pulses of the welding current with a relatively low peak current are repeated.

The waving period setting part 63 sets the waving period Tw which is substantially a total period consisting of the first pulse period TH relating to the high peak current and the second pulse period TL relating to the low peak current. In the second embodiment of the present invention, the waving period Tw is preset so that it is equal to a natural period TY with which the molten pool of the workpiece 31 can be effectively oscillated by the welding wire 33 during the welding process.

In addition, the pulse timing determining part 62 determines the number of the first pulses within the waving period Tw and the number of the second pulses within the waving period Tw, such that the arc force generated by the welding wire 33 makes the molten pool of the workpiece 31 to effectively oscillate at a rate synchronous with the rate corresponding to the natural period TY.

The waving amplitude setting part 66 sets the amplitude of a desired resonant oscillation relating to the molten pool of the workpiece 31. In addition to the resonant oscillation amplitude, the difference between the high peak current relating to the first pulses and the low peak current relating to the second pulses is set by the waving amplitude setting part 66. The pulse determining part 65 determines a peak current value Ip and a pulse duration value Tp relating to each of the first pulses, and determines a peak current value Ip and a pulse duration value Tp relating to each of the second pulses, based on the resonant oscillation amplitude and the peak current difference supplied from the waving amplitude setting part 66.

The reference pulse setting part 64 sets a reference pulse form of the welding current, based on the first pulse period TH, the second pulse period TL, the first pulse number and the second pulse number supplied from the pulse timing determining part 62, and based on the peak current values Ip and the pulse duration values Tp supplied from the pulse determining part 65. Accordingly, if the welding current in the reference pulse form set by the reference pulse setting part 64 described above is continuously supplied to the welding wire 33, the average current Iav set by the wire feeding rate setting part 44 can be suitably controlled. The molten pool of the workpiece 31 can be effectively oscillated by the welding wire 33 at an appropriate rate. The function to transfer one droplet from the welding wire 33 to the workpiece 31 for each of the pulses of the welding current at an appropriate rate can be attained.

Similarly to the pulsed arc welding machine in FIG. 2, the pulsed arc welding machine in FIG. 10 is provided with the voltage detector 36, the voltage comparator 37 and the average voltage setting part 38. The voltage difference between the power cables 28 and 29 is detected by the voltage detector 36, and the value of the measured voltage difference is proportional to the length of the arc between the welding wire 33 and the workpiece 31. In order to maintain the arc length at a desired length, it is necessary to maintain the voltage difference between the power cables 28 and 29 at a given reference voltage.

The voltage detector 36 supplies a signal indicating the measured voltage difference to one input of the voltage comparator 37. The average voltage setting part 38 is connected to the other input of the voltage comparator 37. The average voltage setting part 38 supplies a given reference voltage to the other end of the voltage comparator 37.

The voltage comparator 37 compares the voltage difference from the voltage detector 36 with the reference voltage from the average voltage setting part 38, and the voltage comparator 37 supplies a signal indicating the result of the comparison to a pulse current control part 70.

The voltage detector 36 and the pulse current control part 70 in FIG. 10 respectively correspond to the arc length detecting part 58 and the pulse current control part 59 in FIG. 9.

The pulse current control part 70 adjusts the peak current Ip and the pulse duration Tp for each of the pulses of the welding current in response to the signal supplied from the voltage comparator 37. The peak current Ip and the pulse duration Tp are adjusted so as to maintain the voltage difference at the given reference voltage set by the average voltage setting part 38. Thus, it is possible to maintain the arc length between the welding wire 33 and the workpiece 31 at a desired length.

The pulse form setting part 67 determines a pulse form of the welding current by modifying the reference pulse form set by the reference pulse setting part 64 (or the reference pulse setting part 57 in FIG. 9) in accordance with the peak current Ip and the pulse duration Tp adjusted by the pulse current control part 70. The pulse form setting part 67 in FIG. 10 corresponds to the pulse form setting part 54 in FIG. 9.

In the first embodiment previously described, the base duration setting part 39 adjusts the base duration Tb of the welding current in response to the signal supplied from the voltage comparator 37. However, if the base duration Tb is changed (reduced or increased) in response to the measured voltage difference, the pulse period of the welding current is changed. Therefore, in the first embodiment previously described, there is a problem in that the waving period Tw of the welding current will deviate from the natural period TY, and that the arc force does not make the molten pool of the workpiece to effectively oscillate.

In the second embodiment described above, the pulse form setting part 67 determines a pulse form of the welding current in accordance with the peak current Ip and the pulse duration Tp adjusted by the pulse current control part 70. That is, the reference pulse form of the welding current supplied from the reference pulse setting part 64 is modified in response to a change of the welding current set by the pulse current control part 70. As the result, in the second embodiment, it is possible to reduce or increase the average current Iav supplied to the welding wire 33, without changing the pulse period of the welding current.

FIG. 12A shows the pulse form of the welding current set by the pulse form setting part 67. This pulse form is the reference pulse form set by the reference pulse setting part 64. FIG. 12B shows the pulse form of the welding current set by the pulse form setting part 67 when the pulse duration Tp is increased. FIG. 12C shows the pulse form of the welding current set by the pulse form setting part 67 when the peak current Ip is increased. As shown in FIGS. 12A–12C, the first pulse period TH and the second pulse period TL remain unchanged if the peak current Ip or the pulse duration Tp is increased. The pulse frequency f of the welding current is not changed when the average current Iav is increased or reduced in response to a change in the arc length.

It is necessary to satisfy the condition in which one droplet is transferred from the wire to the workpiece for one pulse even when the peak current or the pulse duration is changed. FIG. 11 shows plots of the pulse duration Tp and the peak current Ip to meet the condition mentioned above. In order to satisfy this condition, the reference pulse setting part 64 determines a reference form of the welding current by selecting one plot of the peak current Ip and the pulse duration Tp which lies in the middle of the shaded range in the chart in FIG. 11.

In the pulsed arc welding machine in FIG. 10, the current detector 40 is connected to the shunt 27 of the power cable 29. This current detector 40 detects the current flowing through the shunt 27, or the arc current used to actually discharge the arc between the welding wire 33 and the workpiece 31. The current detector 40 supplies a signal indicating the measured arc current to one input of a current comparator 69.

The pulse form setting part 67 supplies the welding current to a power driver 68 via the other input of the current comparator 69. The current comparator 68 serves to operate the power driver 68 in a manner such that the welding current having the above described pulse form set by the pulse form setting part 67 is reproduced as the arc current used to actually discharge the arc between the wire and the workpiece.

Similarly to the first embodiment previously described, the inverter 23 serves to arrange a welding current having the above mentioned pulse form based on the signal supplied from the power driver 68, and the inverter 23 supplies the arranged welding current to the input of the transformer 24.

In the second embodiment described above, the average of the welding current supplied to the welding wire can be changed in accordance with the arc length change without changing the pulse period of the welding current. Even when the average of the welding current is changed, the waving period Tw, which is a total period consisting of the first pulse period TH relating to the high peak current and the second pulse period TL relating to the low peak current, can be maintained to be equal to the natural period TY with which the molten pool of the workpiece 31 can be effectively oscillated by the welding wire 33. It is possible to prevent the waving period Tw from deviating from the natural period TY due to the pulse period change when the average current is changed, and the second embodiment can provide a high quality weld joint and a high welding reliability.

Next, a description will be given of a pulsed arc welding method according to the present invention which is a novel and useful arc welding method adapted to a shielded metal arc welding process using a consumable electrode wire.

In a shielded metal arc welding process, the weld zone in which the workpiece is welded with a consumable electrode wire is protected by a shield gas, so as to separate the weld zone from the atmosphere. The shield gas used in the shielded metal arc welding usually includes an inert gas such as argon gas (Ar) and a small amount of carbon dioxide gas ($CO_2$). As carbon dioxide gas is less expensive and has a good shielding characteristic, it is often included in the shield gas of the shielded metal arc welding.

When a galvanized (or zinc-coated) steel sheet is welded with the electrode wire by performing the shielded metal arc welding mentioned above, it is likely that a great amount of weld fume is produced due to the evaporation of zinc included in the galvanized steel sheet. The melting point of iron is around 1500° C. and the boiling point of zinc is around 906° C. Thus, the zinc included in the galvanized steel sheet is increasingly and rapidly vaporized by the heat of arc after the temperature of the weld zone becomes higher than around 906° C. The amount of weld fume produced in the case of the welding of the galvanized steel sheet is nearly three times as great as the amount of weld fume produced in the case of the welding of a non-coated steel sheet.

The zinc vapor derived from the galvanized steel sheet often stays in the weld zone during the welding, causing a number of blowholes there. The shield gas at this time does not serve as an effective measure to prevent the inclusion of the blowholes in the weld joint. Therefore, the resulting weld joint in the case of the shielded metal arc welding of a galvanized steel sheet will have a very poor strength in comparison with the strength of a weld joint in the case of the shielded arc welding of a non-coated steel sheet.

Japanese Laid-Open Patent Publication No.2-37975 discloses a proposed arc welding method for reducing the amount of weld fume or spatter produced during the welding of the galvanized steel sheet. The proposed arc welding method uses a shield gas including carbon dioxide gas ($CO_2$) and oxygen gas ($O_2$). The weld zone is protected by this shield gas so as to separate the weld zone from the atmosphere.

In the proposed method disclosed in the above mentioned publication, the concentration of oxygen included in the shield gas is increased to a ratio higher than the oxygen concentration previously used by the conventional method. Thus, in the case of the proposed method, the zinc included in the galvanized steel sheet is likely to oxidize at the time of welding, and a greater amount of zinc oxide (ZnO) is produced at the weld portion. Generally, zinc oxide sublimates around 1720° C.

When the galvanized steel sheet is welded by using the proposed method mentioned above, a certain amount of zinc in the galvanized steel sheet is oxidized with the oxygen gas with the increased concentration. As the corresponding amount of zinc oxide is produced if the temperature of the weld portion is increasingly higher than the zinc melting point around 906° C., the amount of weld fume produced due to the remaining zinc vapor is reduced. Thus, the number of blowholes can be reduced when the proposed method is used, and it is possible to prevent the strength of the weld portion from being lowered due to the weld fumes and the blowholes.

Next, a description will be given, with reference to FIGS. 21 and 22, of the relationship between the oxygen concentration and the blowhole number, which was obtained by conducting experiments relating to conventional arc welding processes to which the proposed arc welding method disclosed in the above mentioned publication is applied.

Figure 21:
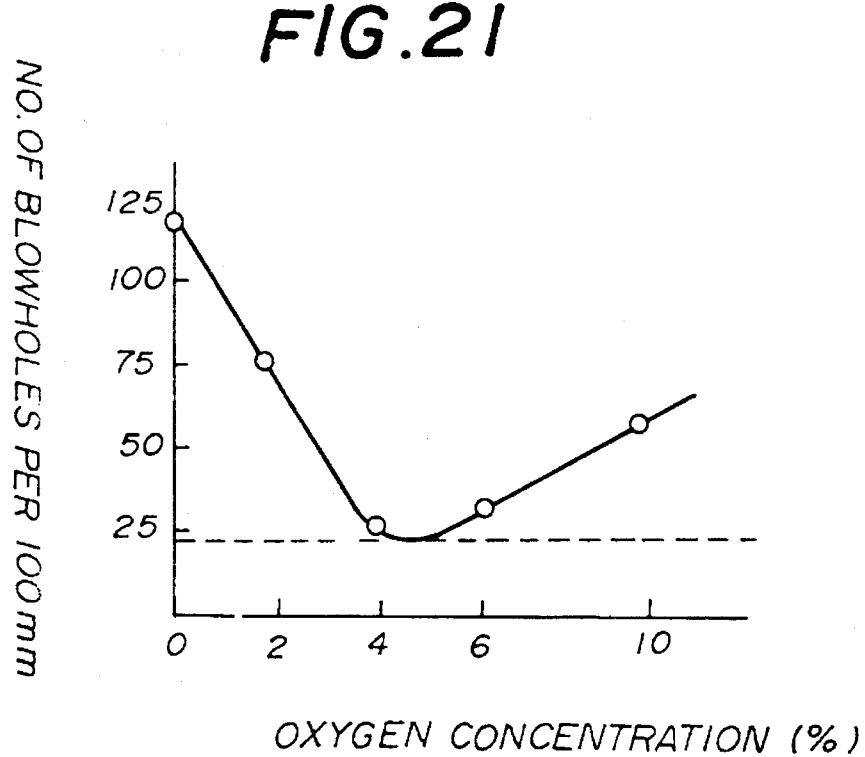
FIG. 21 is a chart showing experimental results on the relationship between the oxygen concentration and the blowhole number when the MAG welding is conducted.

FIG. 21 shows the relationship between the oxygen concentration and the blowhole number when a metal active gas shielded arc welding process (which is called the MAG welding process) to which the proposed method is applied is conducted. The relationship shown in the chart in FIG. 21 is the experimental results obtained by conducting the experiments relating to the MAG welding process. A mixture of argon gas (Ar) and carbon dioxide gas ($CO_2$) is used as the shield gas in the experiments.

In the chart in FIG. 21, the oxygen concentration indicates a ratio of oxygen gas to the shield gas (the mixture of 80% argon gas and 20% carbon dioxide gas) to which the oxygen gas is added. The blowhole number indicates the number of blowholes per unit length (100 mm) of the weld bead. The MAG welding process is performed under the following conditions:

Test Specimen: galvaneal steel sheet, coated 45/m²
Sheet Thickness: 1.6 mm
Joint: fillet-weld lap joint
Welding Wire Diameter: 1.2 mm Composition: C(0.05), Si(0.36), Mn(0.53), P(0.005), Nb(0.94), Fe(the remainder)
Welding Speed: 1 m/min.
Welding Current: 180 A
Welding Voltage: 20 V As indicated in FIG. 21, the blowhole number is sharply reduced when the oxygen concentration is increased between 0% and 4%, and the minimum blowhole number is reached when the oxygen concentration is around 4–6%. However, if the oxygen concentration is increased to greater than 6%, the blowhole number is becoming increasingly greater than the minimum blowhole number. Generally, if the shield gas containing greater than 10% oxygen gas is used, the shielded arc welding will greatly oxidize the base material, and the mechanical property of the base material will be significantly degraded. Thus, it is preferable to use the shield gas containing less than 10% oxygen gas in the shielded arc welding.

Figure 22:
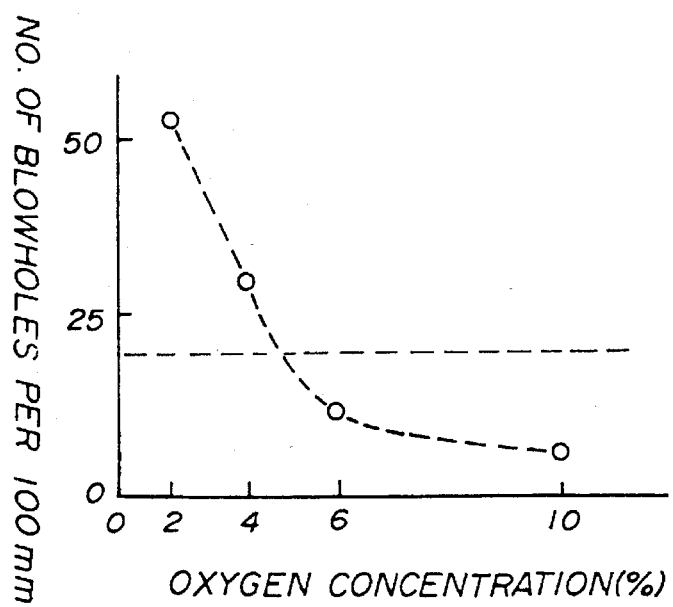
FIG. 22 is a chart showing experimental results on the relationship between the oxygen concentration and the blowhole number when the MIG welding is conducted.

FIG. 22 shows the relationship between the oxygen concentration and the blowhole number when a metal inert gas shielded arc welding process (which is called the MIG welding process) to which the proposed method is applied is conducted. The shield gas including argon gas (Ar) is used in the experiments.

In the chart in FIG. 22, the oxygen concentration indicates a ratio of oxygen gas to the shield gas (including argon gas) to which the oxygen gas is added. The blowhole number indicates the number of blowholes per unit length (100 mm) of the weld bead. The welding conditions under which the MIG welding process is performed are essentially the same as those of the MAG welding process described above, except that the welding current is 220 A and the joint is a fillet-weld T joint.

As indicated in FIG. 22, the blowhole number is sharply reduced when the oxygen concentration is increased between 0% and 6% in the case of the MIG welding process. The blowhole number is slightly reduced when the oxygen concentration is increased from 6% to 10%. However, it is impossible to completely eliminate all the blowholes even if the oxygen concentration is higher than its upper limit of 10% at which the mechanical property of the weld material will be degraded. When the oxygen concentration is around 2% the arc becomes somewhat unstable. When the oxygen concentration is lower than 2%, it is difficult to form the weld bead.

According to the above experimental results, in both cases of the MAG and MIG welding processes, the number of blowholes per unit length of the weld bead can be reduced to a certain extent if the concentration of oxygen gas in the shield gas is increased. However, in the case of the welding of the zinc-coated steel sheet, it is difficult to prevent the blowholes from being included in the weld joint if the oxygen concentration is increased to around 10%. If the oxygen concentration is increased further, it is difficult to obtain the strength of the weld joint equivalent to that in the case of the shielded metal arc welding of a non-coated steel sheet.

In order to eliminate the above mentioned problems, the pulsed arc welding method according to the present invention can be adapted for the shielded metal arc welding processes.

Next, a description will be given, with reference to FIGS. 13A through 20 and FIG. 23, of the pulsed arc welding method according to the present invention.

FIGS. 13A and 13B illustrate the operation of the pulsed arc welding method according to the present invention. In FIGS. 13A and 13B, a workpiece 3 is being welded with a welding wire 1, and arc 2 is discharged from the welding wire 1 to the workpiece 3. This weld zone is protected by a shield gas including argon gas and 25% or less carbon dioxide gas. By supplying a pulsed arc welding current to the welding wire 1, a droplet is produced by the heat of the arc 2 and the droplet is transferred from the wire 1 to the workpiece 3 at an appropriate rate. A molten pool 4 is formed on the workpiece 3.

FIG. 13A is a sectional view showing the weld zone taken along a line A–A' indicated in FIG. 13B. The workpiece 3 is a steel sheet including a blowhole-inducing material, which is, for example, a galvanized steel sheet. The workpiece 3 includes a coated layer 7 (for example, zinc). Within the molten pool 4, a number of blowholes or bubbles 6 are produced in the vicinity of the coated layer 7. As the result of the welding, weld metal 5 is formed on the workpiece 3.

In the pulsed arc welding method of the present invention, the welding current in the optimum pulse form is supplied to the welding wire 1 in a manner similar to those of the first and second embodiments of the pulsed arc welding apparatuses described above. By supplying such a welding current to the welding wire 1, the molten pool 4 of the workpiece 3 can be oscillated by the welding wire 1 at a waving frequency. This waving frequency will be described later in more detail.

In the pulsed arc welding method of the present invention, the average current relating to the welding current supplied to the welding wire 1 varies at the waving frequency. Thus, the arc forces act on the molten pool 4 in an oscillating manner due to the cyclic changes of the average current. As the result, the molten pool 4 of the workpiece 3 is oscillated by the welding wire 1 in directions indicated by arrows A in FIG. 13A.

During the welding of the workpiece 3, a number of blowholes 6 are produced in the vicinity of the coated layer 7. As the molten pool 4 is made to oscillate, it is possible to remove the blowholes 6 from the molten pool 4 into the outside. The blowholes 6 within the molten pool 4 are fed into the outside, for example, in a direction indicated by an arrow B in FIG. 13A. According to the experimental results obtained by the inventors, the waving frequency at which the blowholes 6 are most effectively removed from the molten pool 4 to the outside is found to be in a range between 10 hertz and 50 hertz. Thus, it is possible for the pulsed arc welding method of the present invention to effectively prevent the blowholes from being included in the weld joint when the welding of a galvanized steel sheet is performed. The mechanical strength of the weld joint can be remarkably increased by performing the pulsed arc welding method of the present invention.

FIGS. 14A and 14B show a welding current pulse form and a wire feeding rate used to perform the pulsed arc welding method of the present invention.

In the welding current pulse form in FIG. 14A, first pulses with a relatively high peak current Ih and a relatively small pulse duration th are repeated during a first pulse period TH, and second pulses with a relatively low peak current Il and a relatively great pulse duration tl are repeated during a second pulse period TL. In the present specification, the waving period Tw is hereinafter defined to be a total period consisting of the first pulse period TH relating to the high peak current Ih and the second pulse period TL relating to the low peak current Il. A reference time duration Tref between two pulses, needed to transfer one droplet from the wire to the workpiece for one pulse in the welding of a thin steel sheet, is usually between 3 msec and 7 msec.

Generally, the average current relating to the first pulse period TH is different from the average current relating to the second pulse period TL. For this reason, the average arc force Fh acting on the molten pool 4 during the first pulse period TH and the average arc force Fl acting on the molten pool 4 during the second pulse period TL are different from each other. The average arc forces Fh and Fl vary in an oscillating manner at a rate corresponding to the waving period Tw. In the present specification, the waving frequency is hereinafter defined to be the rate corresponding to the waving period Tw. Theoretically, the waving frequency is the inverse of the waving period Tw.

The average arc forces Fl and Fh are represented by the following equations.

$$Fl = C \cdot \frac{1}{TL} \int_0^{TL} I^2 \cdot dt \quad (4)$$

$$Fh = C \cdot \frac{1}{TH} \int_0^{TH} I^2 \cdot dt \quad (5)$$

where C is a given coefficient.

In the above equations (4) and (5), the average arc force Fl is smaller than the average arc force Fh because Il<Ih. Thus, the arc force for the first pulse period TH and the arc force for the second pulse period TL are different from each other.

It is assumed that the average current and the average wire feeding rate remain unchanged for both of the first and second pulse periods TH and TL. Thus, in this case, the following equation with respect to the average current Iav is satisfied.

$$Iav = C' \cdot \frac{1}{TL} \int_0^{TL} I \cdot dt = C' \cdot \frac{1}{TH} \int_0^{TH} I \cdot dt \quad (6)$$

As described above, the average arc forces Fh and Fl are different from each other, and they vary at the waving frequency in an oscillating manner. Accordingly, the molten pool 4 is made to oscillate by the welding wire 1 when the welding current in the pulse form shown in FIG. 14A is supplied to the welding wire 4. In order to supply such a welding current to the welding wire 4, it is necessary to make use of the second embodiment of the pulsed arc welding apparatus described above.

Briefly, the pulsed arc welding method according to the present invention includes the steps of: supplying a shield gas including argon gas and 25% or less carbon dioxide gas to a weld zone so that the steel sheet is welded by using the wire within the shield gas; feeding the wire toward the steel sheet at a wire feeding rate; supplying a pulsed arc welding current to the wire to produce a droplet at the end of the wire by the heat of arc while the wire is fed toward the steel sheet at the wire feeding rate; determining a first pulse period relating to each of first pulses with a relatively high peak current and a second pulse period relating to each of second pulses with a relatively low peak current based on an average current and a waving frequency; determining peak current values and pulse duration values, relating to the first and second pulses, based on a resonant oscillation amplitude and a peak current difference; and setting a pulse form of the welding current based on the first and second pulse periods, the peak current values and the pulse duration values. In this method, the average current relating to the welding current supplied to the wire varies at the waving frequency, allowing the molten pool of the steel sheet to be oscillated by the wire.

Next, a description will be given of the relationship between the blowhole number and the waving frequency when the welding current in the pulse form in FIG. 14A is used. Hereinafter, the blowhole number refers to the number of the remaining blowholes per unit length of the weld bead.

Figure 15:
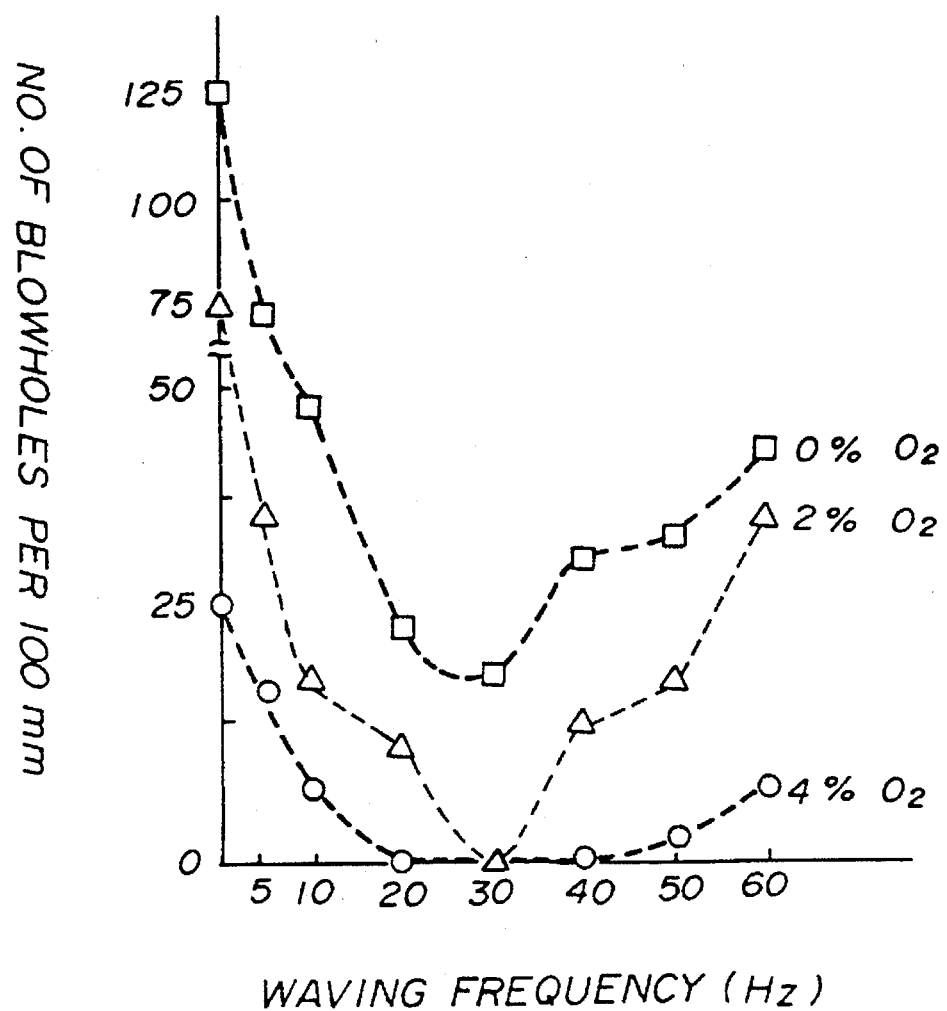
FIG. 15 is a chart showing the relationship between the blowhole number and the waving frequency when the MAG welding is performed by using the welding current pulse form in FIG. 14A.

FIG. 15 shows the relationship between the blowhole number and the waving frequency when the MAG welding process is performed by using the welding current pulse form in FIG. 14A. The experimental results with the shield gas including argon gas and carbon dioxide gas for the respective cases in which 0%, 2% and 4% oxygen gases are added are plotted in the waving frequency vs. blowhole number coordinates.

In FIG. 15, the experimental results in the 0% oxygen gas case show that the increase of the applied waving frequency can reduce the blowhole number to a certain extent. However, the minimum blowhole number obtained in this case is not enough to obtain an adequate weld strength. In the 2% and 4% cases, the non-blowhole level can be reached by selecting the applied waving frequency having an appropriate value. If the waving frequency is set in a range between 10 hertz and 50 hertz, the blowhole reducing effect, equivalent to the minimum blowhole number in the 0% case, can be obtained in the 2% and 4% cases with no regard to the change of the waving frequency. Therefore, the mechanical strength of the weld joint can be maintained at a desired level and a high welding reliability can be ensured if a waving frequency between 10 hertz and 50 hertz is applied to the welding wire.

Figure 16:
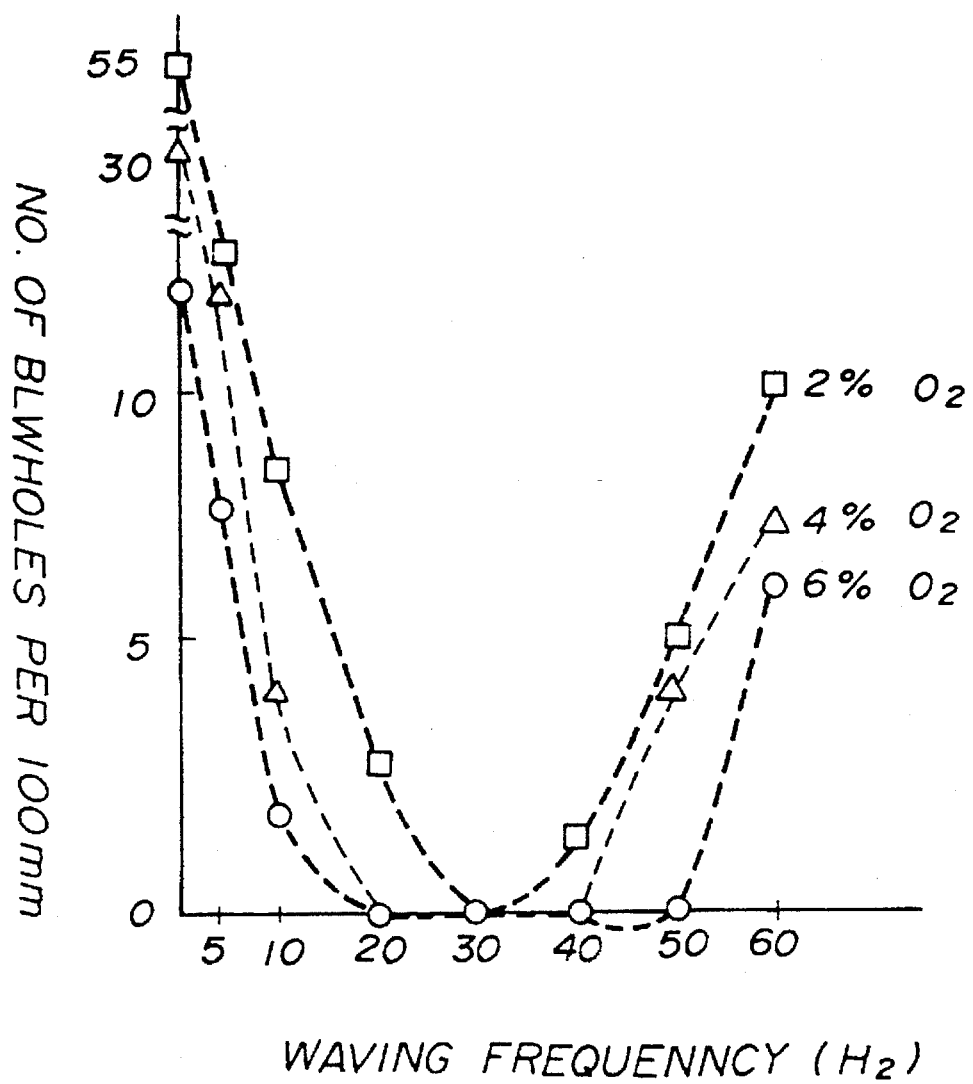
FIG. 16 is a chart showing the relationship between the blowhole number and the waving frequency when the MIG welding is performed by using the welding current pulse form in FIG. 14A.

FIG. 16 shows the relationship between the blowhole number and the waving frequency when the MIG welding process is performed by using the welding current pulse form in FIG. 14A. The experimental results with the shield gas including argon gas for the respective cases in which 2%, 4% and 6% oxygen gases are added are plotted in the waving frequency vs. blowhole number coordinates.

In FIG. 16, the blowhole reducing effect regarding the relationship between the blowhole number and the waving frequency is similar to that shown in FIG. 15. It can be also seen in the case of the MIG welding process that the mechanical strength of the weld joint is maintained at a desired level and that the welding reliability is ensured if a waving frequency between 10 hertz and 50 hertz is applied to the welding wire.

When the welding current in the pulse form in FIG. 14A is applied to the welding wire, the current quantity Sh for the first pulse period TH is substantially the same as the current quantity Sl for the second pulse period TL, although the average arc forces Fh and Fl are different from each other. That is, the following equations are satisfied.

$$Sl = \int_0^{tl} Il \cdot dt \qquad (7)$$

$$Sh = \int_0^{th} Ih \cdot dt \qquad (8)$$

$$Sl = Sh \qquad (9)$$

Therefore, the amount of droplet produced from the welding wire for each of pulses of the welding current is maintained at a constant amount, with no regard to whether it is the first pulse period TH or the second pulse period TL. In the pulsed arc welding method of the present invention, the wire feeding rate of the welding wire 1 can be maintained at a constant speed, and the arc length can be maintained at a desired length if the welding current in the pulse form in FIG. 14A is applied to the welding wire 1.

As described above, since the average arc forces Fl and Fh acting on the molten pool 4 vary in an oscillating manner, the molten pool 4 is moved up and down by the welding wire 1 at the waving frequency (between 10 hertz and 50 hertz). As the blowholes can be removed from the molten pool 4 into the outside, the blowhole reducing function described above is attained by performing the pulsed arc welding method of the present invention.

In the above described embodiment in FIGS. 13A through 14B, the action for varying the average arc forces Fl and Fh on the molten pool 4 is accomplished by making use of the peak current difference between the first peak current Ih and the second peak current Il used in the welding current pulse form. However, it should be noted that the action for oscillating the molten pool 4 of the workpiece can be accomplished by making use of other suitable means. For example, the molten pool oscillating action can be accomplished by either suitably changing the average current relating to the welding current or suitably changing the wire feeding rate.

FIGS. 17A and 17B show a welding current pulse form and a wire feeding rate when the average current is changed. The welding current pulse form in FIG. 17A is used to attain the molten pool oscillating action by changing the average current in an oscillating manner. The great pulse duration th and the small pulse duration tl are the same as those shown in FIG. 14A. In comparison with the welding current pulse form in FIG. 14A, the high peak current Ih during the first pulse period TH is increased, and the low peak current Il during the second pulse period TL is reduced. When the welding current in the pulse form in FIG. 17A is applied to the welding wire 1, the average arc force Fh is increased during the first pulse period TH and the average arc force Fl is reduced during the second pulse period TL. Thus, the molten pool oscillating action can be attained.

However, when the welding current in the pulse form in FIG. 17A is used, the amount of droplet produced during the first pulse period TH and the amount of droplet produced during the second pulse period TL are different from each other. Therefore, it is necessary to suitably change the wire feeding rate in accordance with the waving frequency relating to the welding current. FIG. 17B shows the change of the wire feeding rate in this case.

FIGS. 18A and 18B show a welding current pulse form and a wire feeding rate when the wire feeding rate is changed. The welding current pulse form in FIG. 18A is used to attain the molten pool oscillating action by changing the wire feeding rate in an oscillating manner. In order to maintain the arc length at a desired length, it is necessary to suitably change the average current in proportion to the arc length change. In the welding current pulse form in FIG. 18A, the number of first pulses during the first pulse period TH remains unchanged, and the number of second pulses during the second pulse period TL is reduced in comparison with that of the pulse form shown in FIG. 14A. The reference pulse period Tref and the waving period Tw in FIG. 18A are the same as those shown in FIG. 14A. In comparison with the wire feeding rate shown in FIG. 14B, the wire feeding rate during the first pulse period TH in FIG. 18B is increased to a relatively high feeding rate VH, and the wire feeding rate during the second pulse period TL is reduced to a relatively low feeding rate VL. If the welding current in the pulse form in FIG. 18A is applied to the wire while the wire is fed at the thus controlled wire feeding rate, the average arc force Fh is increased during the first pulse period TH and the average arc force Fl is reduced during the second pulse period TL. Thus, the molten pool oscillating action can be attained.

FIG. 19 shows a procedure for welding an enclosed container to which the present invention is applied. In FIG.

19, an enclosed container 8 is welded with the welding wire 1 by performing the pulsed arc welding method of the present invention. It is known that the air within the container 8, expanded due to the heat of arc, enters the molten pool 4, and that the blowholes are produced with the remaining air in the molten pool. By performing the pulsed arc welding method of the present invention to weld the enclosed container, it is possible to readily eliminate the remaining air from the molten pool. As the blowhole number is remarkably reduced, the mechanical strength of the weld joint can be increased.

Figure 20:
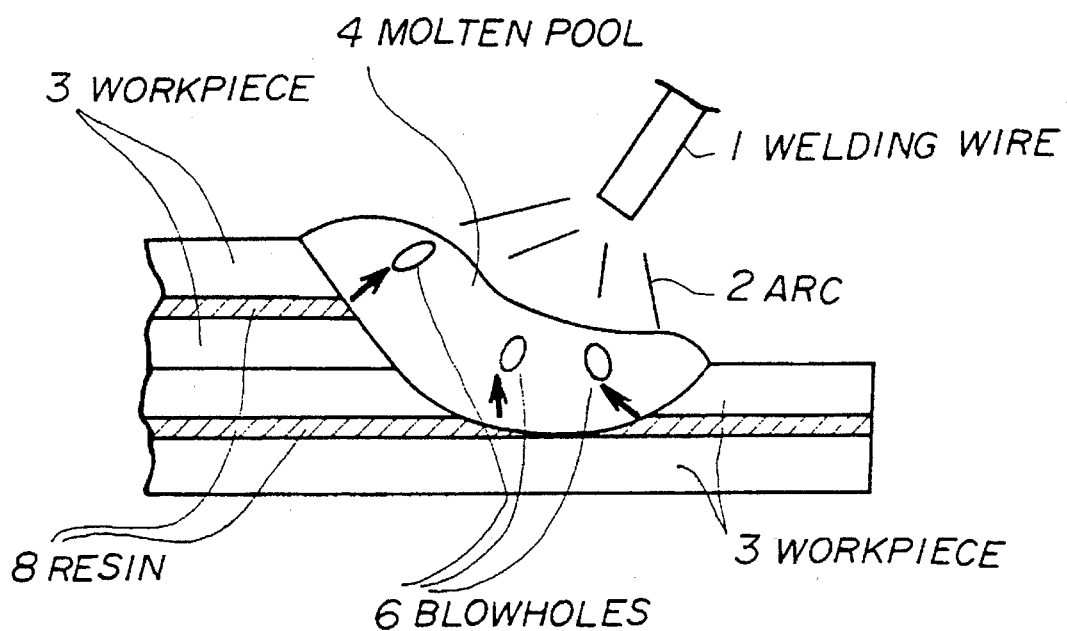
FIG. 20 is a diagram for explaining the welding of a vibration damping steel sheet to which the present invention is applied.

FIG. 20 shows a procedure for welding a vibration damping steel sheet to which the present invention is applied. In FIG. 20, the workpieces 3 each of which is a vibration damping steel sheet having a resin layer 8 are welded with the welding wire 1 by performing the pulsed arc welding method of the present invention. It is known that the resin layer 6 within the molten pool 4 is the factor to produce the blowholes 6 in the weld joint. By performing the pulsed arc welding method of the present invention to join the workpieces 3, it is possible to readily eliminate the blowholes from the molten pool 4. As the blowhole number is remarkably reduced, the mechanical strength of the weld joint can be increased.

Figure 23:
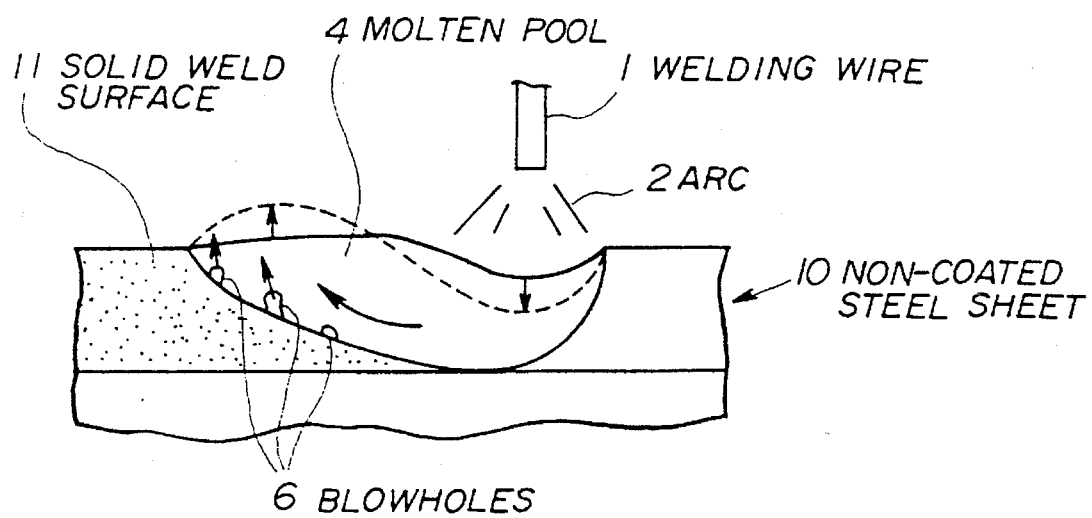
FIG. 23 is a diagram for explaining the pulsed arc welding procedure of a steel sheet according to the present invention.

FIG. 23 shows a procedure for welding a non-coated steel sheet to which the present invention is applied. In FIG. 23, a non-coated steel sheet 10 is welded with the welding wire 1 by performing the pulsed arc welding method of the present invention. In this weld zone, the shielding condition is poor and the arc 2 and the molten pool 4 are partially exposed to the atmosphere. It is known that nitrogen gas of the atmospheric air mixed into the molten pool 4 is the factor to produce the blowholes 6 on a solid weld surface 11. By performing the pulsed arc welding method of the present invention to weld the non-coated steel sheet 10, it is possible to effectively prevent the blowholes 6 from remaining on the solid weld surface 11. As the blowhole number is remarkably reduced, the mechanical strength of the weld joint can be increased.

Further, the present invention is not limited to the above described embodiments, and variations and modifications may be made without departing from the scope of the present invention.

What is claimed is:

1. A pulsed arc welding method for welding a steel sheet coated with a blowhole-inducing material by using a consumable electrode wire, said method comprising the steps of:

supplying a shield gas including argon gas and carbon dioxide gas to a weld zone so that the steel sheet is welded by using the wire within the shield gas, wherein the concentration of the carbon dioxide gas within the shield gas is no more than 25%;

feeding the wire toward the steel sheet at a wire feeding rate;

supplying a pulsed arc welding current to the wire to melt an end portion of the wire thereby producing a droplet at the end of the wire, wherein the pulsed arc welding current includes a plurality of first pulses having a first peak current and a plurality of second pulses having a second peak current, the second peak current being lower than the first peak current, and wherein the droplet is transferred to a surface of the steel sheet to form a molten pool thereon;

determining a first pulse period relating to each of the first pulses and a second pulse period relating to each of the second pulses, said first pulse period and said second pulse period defining a waving frequency of the arc welding current at which a quantity of blowholes induced in the molten pool is minimized;

determining peak current values and pulse duration values relating to said first and second pulses based on a resonant oscillation amplitude of the molten pool and a peak current difference; and determining a pulse form of an average current relating to the arc welding current based on said first and second pulse periods, said peak current values and said pulse duration values, whereby the average current relating to the arc welding current supplied to the wire is varied at the waving frequency so that the molten pool oscillates.

2. A pulsed arc welding method according to claim 1, wherein said waving frequency is within a range of between 10 hertz and 50 hertz.

3. A pulsed arc welding method according to claim 1, wherein said shield gas further includes oxygen gas, and the concentration of the oxygen gas within the shield gas is within a range of between 2% and 6%.

\* \* \* \* \*

UNITED STATES PATENT AND TRADEMARK OFFICE
CERTIFICATE OF CORRECTION

PATENT NO. : 5,473,139
DATED : December 5, 1995
INVENTOR(S) : Hitoshi Matsui, et al It is certified that error appears in the above-indentified patent and that said Letters Patent is hereby corrected as shown below:

Column 5, line 39, Change "31" to --35--.

Column 11, line 16, Change "54" to --57--. (first occurrence)

Signed and Sealed this

Twenty-eighth Day of May, 1996

Attest:

BRUCE LEHMAN

*Attesting Officer*      *Commissioner of Patents and Trademarks*